(12) United States Patent
Harazono et al.

(10) Patent No.: US 9,233,729 B2
(45) Date of Patent: Jan. 12, 2016

(54) STEERING DAMPER CONTROL APPARATUS, AND A SADDLE RIDING TYPE VEHICLE HAVING THE SAME

(75) Inventors: Yasunobu Harazono, Shizuoka (JP); Masashi Matsuo, Shizuoka (JP); Nobuo Hara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/116,184

(22) PCT Filed: May 9, 2012

(86) PCT No.: PCT/JP2012/003035
§ 371 (c)(1),
(2), (4) Date: Nov. 7, 2013

(87) PCT Pub. No.: WO2012/153527
PCT Pub. Date: Nov. 15, 2012

(65) Prior Publication Data
US 2014/0058626 A1    Feb. 27, 2014

(30) Foreign Application Priority Data

May 10, 2011    (JP) .................................. 2011-105114

(51) Int. Cl.
*B62K 21/08*    (2006.01)
*F16F 15/18*    (2006.01)
*F16F 9/53*    (2006.01)

(52) U.S. Cl.
CPC . *B62K 21/08* (2013.01); *F16F 9/53* (2013.01); *F16F 15/18* (2013.01); *F16F 2224/045* (2013.01); *F16F 2230/18* (2013.01)

(58) Field of Classification Search
CPC ............. F16F 9/53; F16F 9/532; F16F 9/535; F16F 15/18; B62K 21/08
See application file for complete search history.

(56) References Cited

U.S. PATENT DOCUMENTS 5,396,973 A * 3/1995 Schwemmer et al. ...... 188/267.1
6,708,795 B2 * 3/2004 Hasegawa et al. ............ 180/423

(Continued)

FOREIGN PATENT DOCUMENTS

| EP | 1 248 013 A2 | 10/2002 |
|---|---|---|
| JP | 63-11492 A | 1/1988 |
| JP | 05-201377 A | 8/1993 |
| JP | 2001-301682 A | 10/2001 |
| JP | 2002-302085 A | 10/2002 |

(Continued)

OTHER PUBLICATIONS

Official Communication issued in International Patent Application No. PCT/JP2012/003035, mailed on Aug. 14, 2012.

(Continued)

*Primary Examiner* — Todd Melton
(74) *Attorney, Agent, or Firm* — Keating and Bennett, LLP

(57) ABSTRACT

A steering damper control apparatus includes an MR damper having an adjustable steering damping force, a suspension pressure sensor that detects a pressure of a front suspension, a command value output unit that determines a damping force command value according to a pressure change rate of the front suspension based on a detection result of the suspension pressure sensor, and a damper driver that causes the MR damper to generate a damping force corresponding to the damping force command value. At a point of time when steering becomes easily shakable, the damping force corresponding to the damping force command value is generated to prevent shaking of the steering beforehand.

15 Claims, 18 Drawing Sheets

(56) References Cited

U.S. PATENT DOCUMENTS

| | | | |
|---|---|---|---|
| 7,793,957 B2 * | 9/2010 | Furuya | 280/272 |
| 8,775,024 B2 * | 7/2014 | Hara et al. | 701/41 |
| 8,972,108 B2 * | 3/2015 | Acocella | 701/37 |
| 2002/0152832 A1 | 10/2002 | Hasegawa et al. | |
| 2009/0302557 A1 | 12/2009 | Hara et al. | |
| 2010/0299028 A1 * | 11/2010 | Savaresi et al. | 701/42 |

FOREIGN PATENT DOCUMENTS

| | | |
|---|---|---|
| JP | 2009-126432 A | 6/2009 |
| JP | 2009-292258 A | 12/2009 |

OTHER PUBLICATIONS

Official Communication issued in corresponding European Patent Application No. 12782844.0, mailed on Jul. 16, 2014.

\* cited by examiner

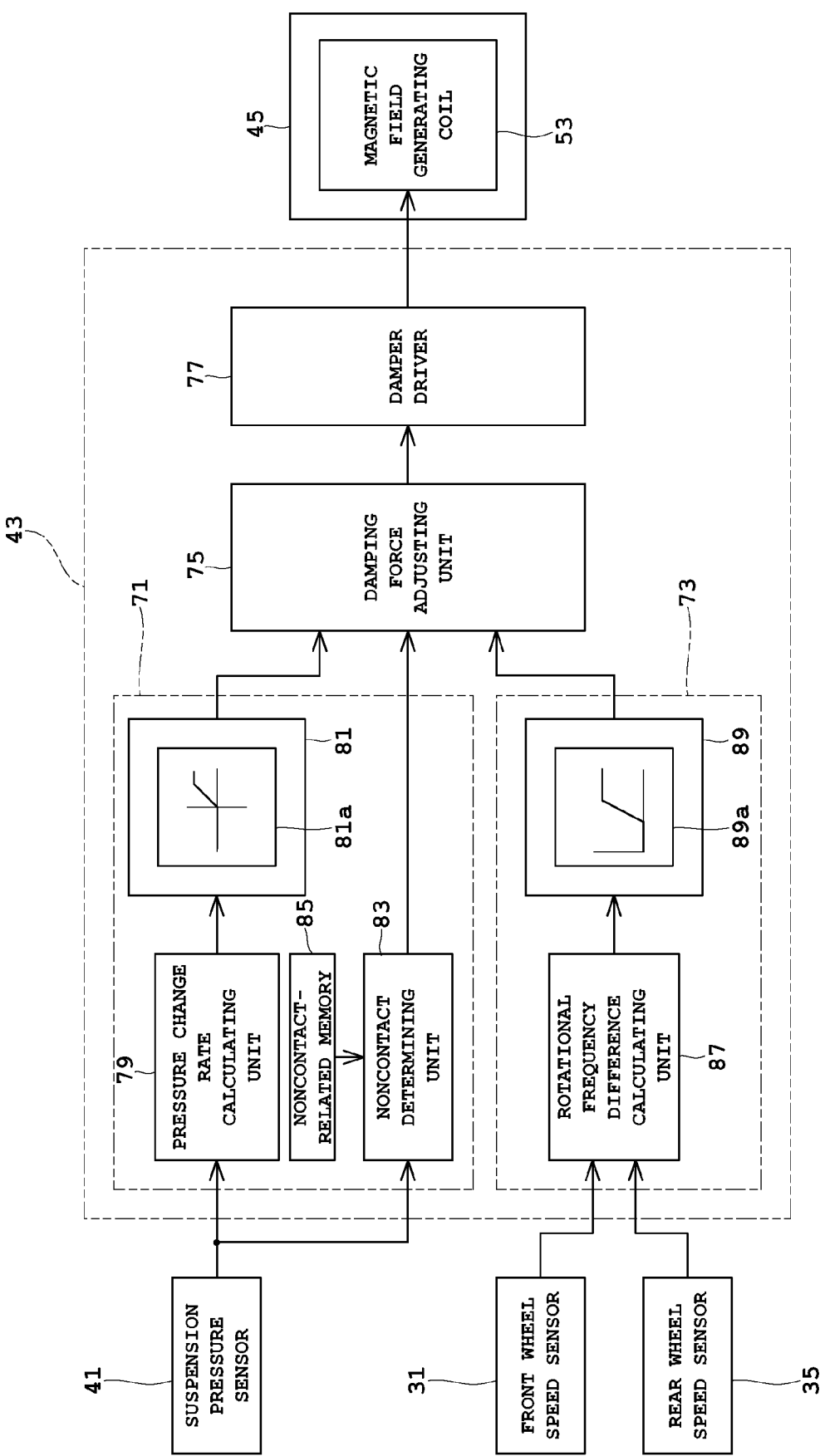

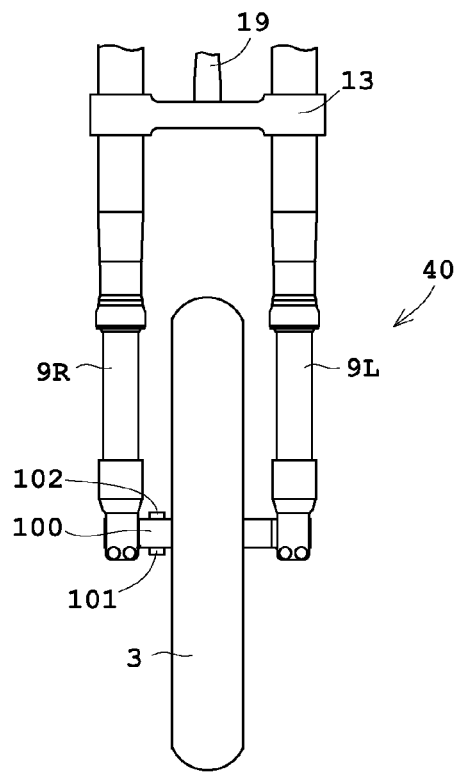
Fig. 19A
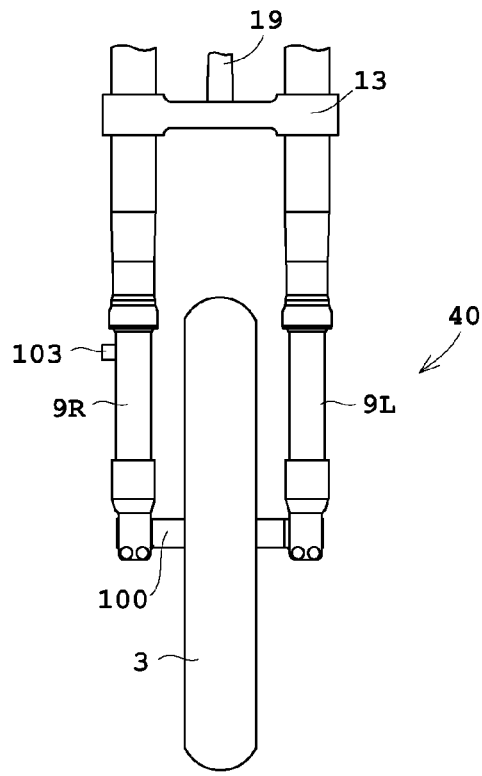
Fig. 19B
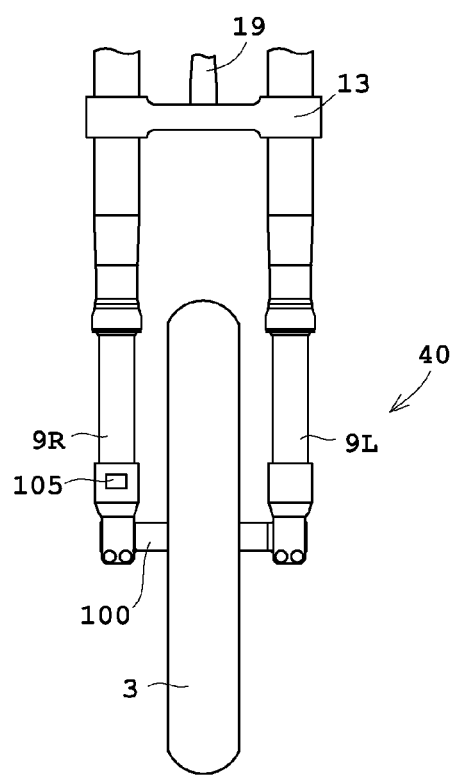
Fib. 19C
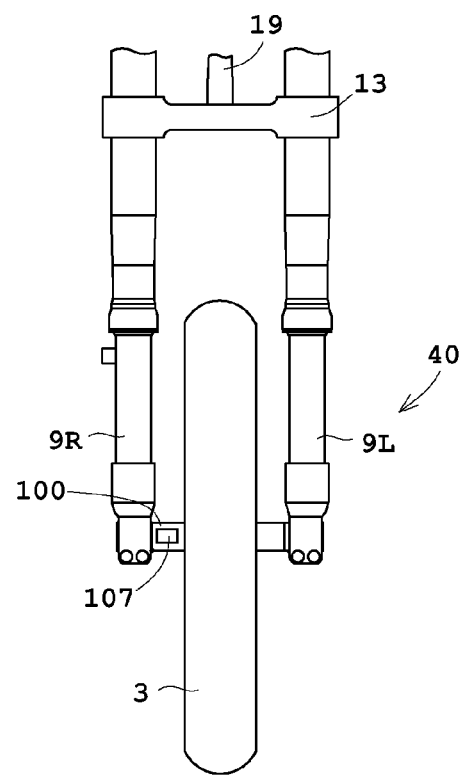
Fig. 19D

STEERING DAMPER CONTROL APPARATUS, AND A SADDLE RIDING TYPE VEHICLE HAVING THE SAME

BACKGROUND OF THE INVENTION

1. Field of the Invention

The present invention relates to a steering damper control apparatus that controls a damping force of a steering damper provided in a steering device of a vehicle to adjust a damping force, and to a saddle riding type vehicle including the same.

2. Description of the Related Art

Recently, saddle riding type vehicles including a steering damper control apparatus to adjust a damping force of a steering device in order to stabilize posture changes and to ease the riders' burden have been increasing in popularity. Such steering damper control apparatus include the following.

A first apparatus of this type has a steering device, a steering damper, an adjusting mechanism, a rear stroke sensor, and a control device (see Japanese Unexamined Patent Publication No. 2009-126432, for example). The steering device is pivotably supported by a vehicle body. The steering damper applies a damping force to the torque of the steering device. The adjusting mechanism adjusts the damping force of the steering damper. The rear stroke sensor detects an amount of stroke of a rear suspension. Based on outputs of the rear stroke sensor, the control device, when the vehicle is slowing down, controls the adjusting mechanism to increase the damping force of the steering damper compared with a time of steady traveling.

This first apparatus, when the vehicle is determined to be slowing down based on the outputs of the rear stroke sensor, increases the damping force of the steering damper. This can prevent kickbacks produced against the rider's intention by the steering device undergoing disturbance of the traveling surface, for example. As a result, posture changes of the vehicle can be prevented even when the vehicle is slowing down.

A second apparatus of this type includes a steering damper which adjusts a damping force according to an amount of operation of the accelerator. When an opening degree of the accelerator is small, the vehicle is determined to be traveling at low speed, and the damping force is kept low. When the opening degree of the accelerator is large, the vehicle is determined to be traveling at high speed, and the damping force is increased (see Japanese Unexamined Patent Publication No. 2001-301682, for example).

This second apparatus determines a traveling state based on the amount of operation of the accelerator, thus preventing the steering device from becoming unstable which would easily produce a situation where the front wheel is subject to levitation. As a result of this determination, posture changes of the vehicle can be prevented during acceleration.

A third apparatus of this type includes an acceleration detector and a control device (see Japanese Unexamined Patent Publication No. 2002-302085, for example). The acceleration detector detects acceleration of the vehicle body. Only when the acceleration exceeds a threshold value, the control device causes a steering damper to generate a damping force.

Although a load of the front wheel will decrease to produce a kickback easily when acceleration reaches or exceeds the threshold value, this third apparatus can increase the damping force of the steering damper to prevent a kickback. As a result, posture changes of the vehicle can be prevented during acceleration.

SUMMARY OF THE INVENTION

Preferred embodiments of the present invention have been made in regard to the state of the art noted above, and provide a steering damper control apparatus and a saddle riding type vehicle including the same, which conveniently prevent steering vibration.

A preferred embodiment of the present invention includes a steering damper control apparatus including a damper having an adjustable steering damping force, a load information detecting unit that detects information relating to a load acting on a front wheel, a command value output unit that determines a damping force command value according to a rate of change of the load acting on the front wheel or a value corresponding to the rate of change based on a detection result of the load information detecting unit, and a damper driver that causes the damper to generate a damping force according to the damping force command value.

The rate of change of the load on the front wheel or the value corresponding thereto is to a certain extent relevant to vibration caused by disturbances to the steering device. For example, the steering device tends to be easily shaken immediately after the load acting on the front wheel becomes large. The above construction generates a steering damping force based on the rate of change of the load on the front wheel or the value (indicator) corresponding thereto. Therefore, even if the steering device is not actually shaken, the damping force corresponding to the damping force command value can be generated at a point of time when the steering device has become easily shaken. This makes the steering device difficult to move (the feeling of steering control becomes heavy), thus preventing shaking of the steering device beforehand.

The rate of change of the load or the value corresponding thereto will be called hereinafter the "rate of change or the like" as appropriate.

In a preferred embodiment of the present invention, it is preferable that, in at least a portion of a range where the rate of change of the load or the value corresponding to the rate of change is positive, the damping force command value becomes larger as the rate of change of the load or the value corresponding to the rate of change becomes larger.

When a load acting substantially upward on the front wheel increases, the rate of change of the load or the like becomes positive. When the rate of change of the load or the like is positive, compared with when it is negative, the steering device tends to be easily shaken. The faster the increase of the load results in the larger rate of change of the load or the like. The larger rate of change of the load or the like is, the steering device tends to be shaken by a greater force. The above construction can substantially apply the damping force to the steering device when the steering device vibrates easily. The larger the disturbance that vibrates the steering device, the larger the damping force. Therefore, even when a change of the load is fast, steering vibration can be prevented effectively.

In a preferred embodiment of the present invention, it is preferable that, in the above range, an amount of increase of the damping force command value becomes larger as the rate of change of the load becomes larger. This prevents the steering vibration with an increased effect.

In a preferred embodiment of the present invention, it is preferable that, in the above range, the damping force command value becomes larger at a constant rate as the rate of change of the load or the value corresponding to the rate of change becomes larger. The damping force increases in proportion to the rate of change of the load or the like. Therefore, the steering vibration is prevented with an increased effect.

In a preferred embodiment of the present invention, it is preferable that, when the rate of change of the load or the value corresponding to the rate of change is larger than a positive threshold value, the damping force command value is a fixed value. Since no excessive damping force more than necessary is generated, the rider's burden is conveniently eased.

In a preferred embodiment of the present invention, it is preferable that the fixed value is equal to the damping force command value at a time when the rate of change of the load or the value corresponding to the rate of change is at the threshold value. Since the amount of the damping force is continuous near the threshold value, an unnatural change in steering controllability (ease of movement) can be avoided.

In a preferred embodiment of the present invention, it is preferable that, when the rate of change of the load or the value corresponding to the rate of change is smaller than a predetermined positive value, the damping force command value is at a minimum.

The load acting on the front wheel increases most sharply at the moment the front wheel is subjected to a shock from the traveling surface, thereafter the change of the load eases off, and the load tends to reduce over time. The above construction sets the damping force command value to a minimum when the rate of change of the load or the like, even if positive, is smaller than the predetermined value (the predetermined value being a positive value). When the damping force command value is at a minimum, the damping force acting on the steering device is minimal, which renders the steering device easy to move (lightens the feeling of steering control). In other words, only when an upward load acting on the front wheel is increasing sharply, a damping force command value larger than the minimum substantially applies the damping force to the steering device. This, while preventing steering vibration, can conveniently prevent the steering controllability from being impaired.

In a preferred embodiment of the present invention, it is preferable that, when the rate of change of the load or the value corresponding to the rate of change is positive, the damping force command value is larger than a minimum. When the load acting on the front wheel is increasing, the damping force is larger than a minimum. This conveniently prevents steering vibration.

In a preferred embodiment of the present invention, it is preferable that, when the rate of change of the load or the value corresponding to the rate of change is negative, the damping force command value is at a minimum.

When the steering device is relatively difficult to shake, the damping force is set to a minimum. This lightens the feeling of steering control, and can conveniently prevents lowering of the steering controllability.

In a preferred embodiment of the present invention, it is preferable that the damper includes a magnetic fluid, and a magnetic field generating coil that applies a magnetic field to the magnetic fluid; and the damper driver that causes an electric current corresponding to the damping force command value to flow to the magnetic field generating coil.

The magnetic field applied to the magnetic fluid changes the viscosity of the magnetic fluid substantially generating a damping force. Therefore, even if the steering device is actually not moving (even if not vibrating), the damper can apply the damping force to the steering device.

In a preferred embodiment of the present invention, it is preferable that the damper generates the damping force by a shearing force of the magnetic fluid; and the magnetic field generating coil varies the shearing force of the magnetic fluid for the steering. The damper is what is called the "shear type".

Therefore, when the damping force command value is reduced to the minimum, the damping force is made as small as possible. Consequently, when the damping force is minimal, lowering of the steering controllability is prevented with increased effect.

In a preferred embodiment of the present invention, it is preferable that the load information detecting unit is a pressure detecting device that detects a pressure of a suspension of the front wheel; and the command value output unit determines a damping force command value according to a rate of change of the pressure of the suspension. The pressure of the suspension corresponds to a load acting on the front wheel. The rate of change of the pressure of the suspension is a value corresponding to the rate of change of the load on the front wheel. Therefore, with the pressure detecting device, the load information detecting unit is conveniently achieved.

A preferred embodiment of the present invention provides a saddle riding type vehicle including a steering damper control apparatus, wherein the steering damper control apparatus includes a damper having an adjustable steering damping force; a load information detecting unit that detects information relating to a load acting on a front wheel; a command value output unit that determines a damping force command value according to a rate of change of the load acting on the front wheel or a value corresponding to the rate of change based on a detection result of the load information detecting unit; and a damper driver that causes the damper to generate a damping force according to the damping force command value.

The steering damper control apparatus can generate a damping force corresponding to the damping force command value at a point of time when the steering device has become easily shaken, even if the steering device is not actually shaken. Consequently, shaking of the steering device can be prevented beforehand. This conveniently eases and prevents a burden on the rider in controlling the steering.

According to the steering damper control apparatus and the saddle riding type vehicle including the same of preferred embodiments of the present invention, shaking of steering is prevented conveniently, and the burden on the rider in controlling the steering is eased. Therefore, the rider can run the saddle riding type vehicle comfortably.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A to 3C are views showing a construction of an MR damper, in which FIG. 3A is a view in vertical section showing an outline of the MR damper, FIG. 3B is an exploded perspective view, and FIG. 3C is an enlarged fragmentary sectional view.

FIG. 4 is a block diagram showing an outline of a steering damper control apparatus according to the first preferred embodiment of the present invention.

FIG. 19A to FIG. 19D are views each showing a modified preferred embodiment of a load information detecting unit that detects information on a load acting on a front wheel.

DETAILED DESCRIPTION OF THE PREFERRED EMBODIMENTS

A first preferred embodiment of the present invention will be described hereinafter with reference to the drawings.

A motorcycle will be described as an example of saddle riding type vehicles including a steering damper control apparatus according to preferred embodiments of the present invention.

Figure 1:
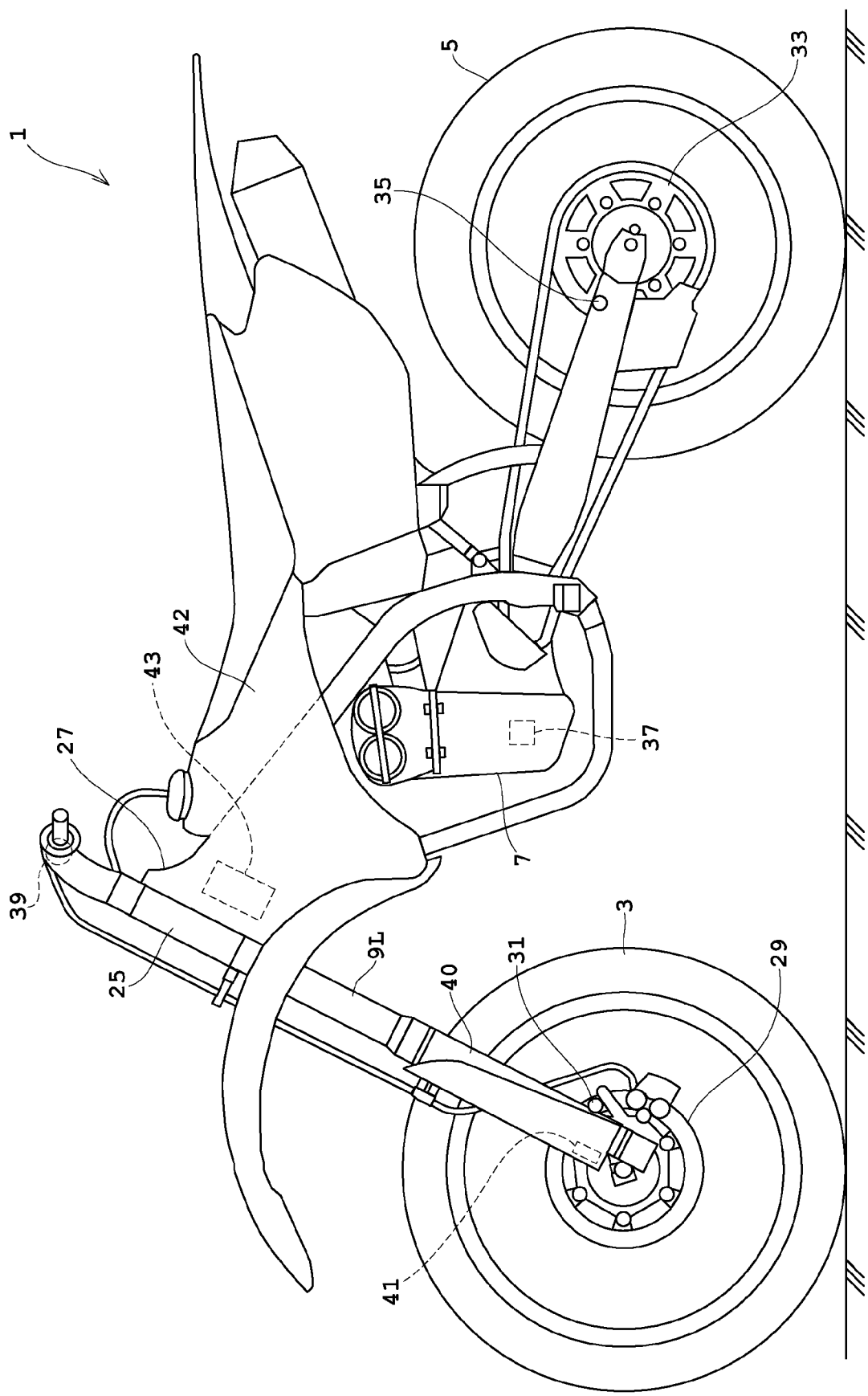
FIG. 1 is a side view showing an outline of a motorcycle according to a first preferred embodiment of the present invention.
Figure 2:
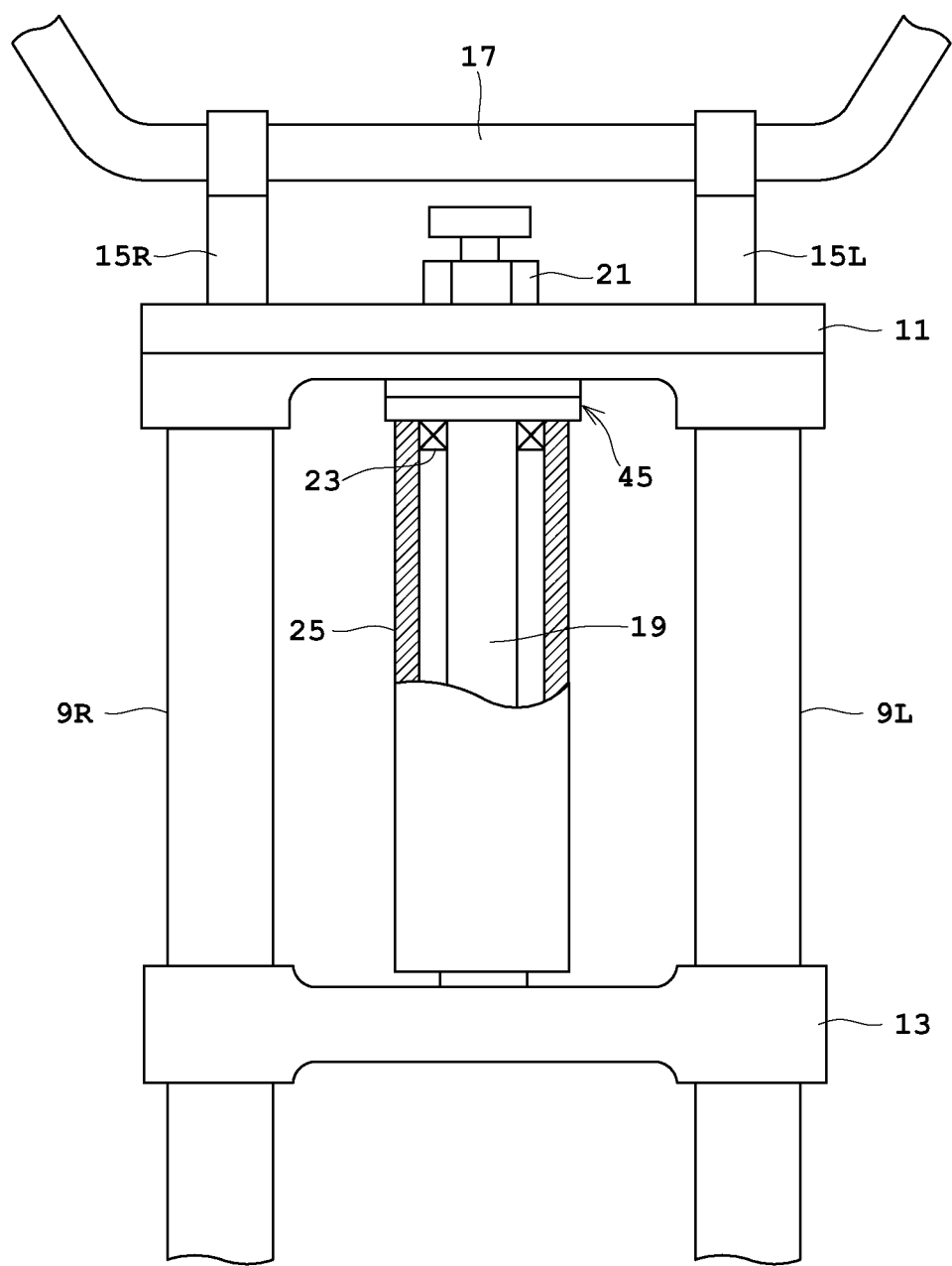
FIG. 2 is a front view partly in section showing a construction around a steering crown.

FIG. 1 is a side view showing an outline of a motorcycle according to the first preferred embodiment. FIG. 2 is a front view partly in section showing a construction around a steering crown.

A motorcycle 1 includes a front wheel 3 and a rear wheel 5. The rear wheel 5 is driven to rotate by a driving force generated by an engine 7. The front wheel 3 is rotatably supported by a pair of left and right front forks 9L and 9R. The front forks 9L and 9R include upper ends thereof connected to and supported by a steering crown 11. The front forks 9L and 9R include intermediate portions connected to and supported by an under bracket 13. The steering crown 11 includes a pair of left and right handle holders 15L and 15R arranged on an upper surface thereof. These handle holders 15L and 15R hold a steering bar 17 controllable by the rider. The handle crown 11 and under bracket 13 are connected by a steering shaft 19. The lower end of the steering shaft 19 is engaged by a steering shaft receiver (not shown) of the under bracket 13 so as not to come off upward. The upper end of the steering shaft 19 is preferably secured to the steering crown 11 with a nut 21, for example.

The steering shaft 19 is rotatably supported by a head pipe 25 through bearings 23. The head pipe 25 is connected to a vehicle body frame 27. When the rider operates the steering bar 17, its steering force is transmitted to the front forks 9L and 9R through the steering shaft 19 to steer the front wheel 3.

A front wheel speed sensor 31 that detects rotational frequencies of the front wheel 3 is disposed adjacent to a disk brake 29 provided on the front wheel 3. A rear wheel speed sensor 35 that detects rotational frequencies of the rear wheel 5 is disposed adjacent to a driven sprocket 33 provided on the rear wheel 5. An engine rotational frequency sensor 37 that detects rotational frequencies of the engine is disposed adjacent to a crankshaft (not shown) of the engine 7. A throttle position sensor 39 that detects throttle opening degrees is disposed adjacent to an accelerator grip (not shown) of the steering bar 17. The front fork 9L includes a suspension pressure sensor 41 that detects pressures of a front suspension 40. The output of each sensor is inputted to a controller 43 disposed in front of a fuel tank 42.

Figure 3A:
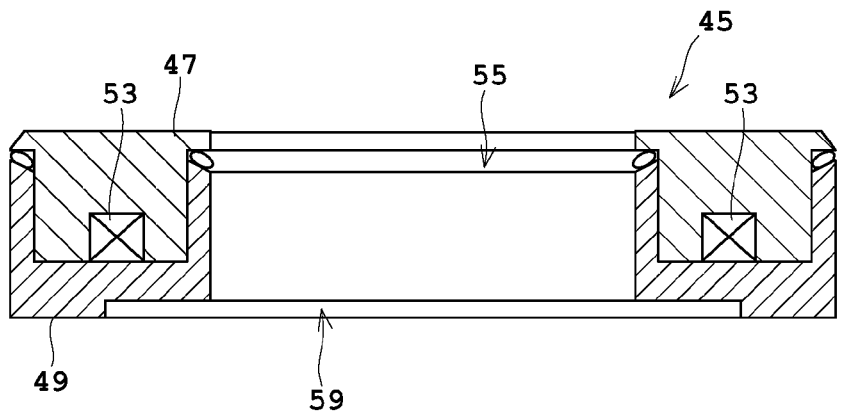
Figure 3B:
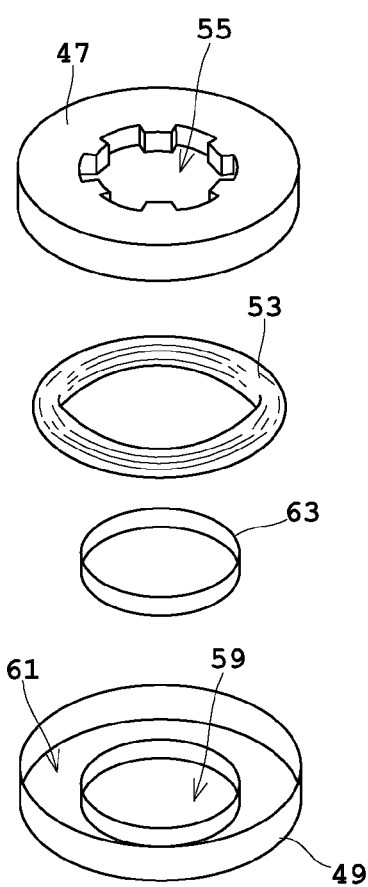
Figure 3C:
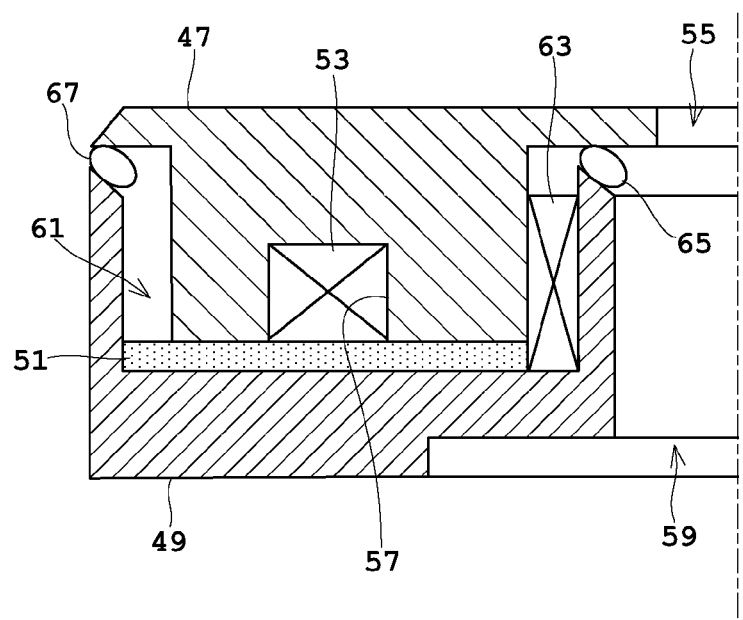

An MR (magneto-rheological) damper 45 is disposed below the steering crown 11. This MR damper 45 uses a magnetic fluid to generate damping forces for rotation of the steering shaft 19 occurring with steering operation. The construction of the MR damper 45 will be described with reference to FIGS. 3A to 3C. FIGS. 3A to 3C show the construction of the MR damper 45, in which FIG. 3A is a view in vertical section showing an outline of the MR damper, FIG. 3B is an exploded perspective view, and FIG. 3C is an enlarged fragmentary sectional view.

The MR damper 45 includes an upper yoke 47 and a lower yoke 49, a magnetic fluid 51, and a magnetic field generating coil 53. The magnetic fluid 51 is interposed between the upper yoke 47 and the lower yoke 49. The magnetic field generating coil 53 applies a magnetic field to the magnetic fluid 51. The upper yoke 47 includes a through-hole 55 in a center thereof to receive the steering shaft 19, and has an annular or substantially annular shape. The upper yoke 47 is preferably made of a magnetic material such as rolled steel, for example.

The upper yoke 47 includes an annular groove 57 in the bottom thereof. This annular groove 57 houses the magnetic field generating coil 53. The magnetic field generating coil 53 is supplied with a current corresponding to a steering damping force from the controller 43.

Similarly to the upper yoke 47, the lower yoke 49 includes a through-hole 59 in a center thereof to receive the steering shaft 19, and has an annular or substantially annular shape. As is the upper yoke 47, the lower yoke 49 also is preferably made of a magnetic material such as rolled steel. An annular groove 61 is provided in the upper surface of the lower yoke 49. This groove 61 fits the upper yoke 47 therein.

The groove 61 of the lower yoke 49 includes, fitted on an inner wall thereof, a cylindrical collar 63 made of a metallic material such as aluminum. The upper yoke 47 is rotatably held by the lower yoke 49 through this collar 63. The collar 63 may be replaced with a well-known roll bearing. However, by using the collar 63 the MR damper 45 can be reduced in size.

The lower yoke 49 houses the magnetic fluid 51 in the groove 61. The bottom of the groove 61 of the lower yoke 49 and the lower surface of the upper yoke 47 are opposed to each other with the magnetic fluid 51 in between. Preferably, the magnetic fluid 51 contains about 40% of carbonyl iron, for example. When the magnetic field is applied to the magnetic fluid 51, its viscosity will increase the damping force of the MR damper 45. The magnetic fluid 51 has a certain fixed viscosity without the magnetic field applied thereto. Thus, the MR damper 45 generates a minimum damping force when no magnetic field is applied.

O-rings 65 and 67 are fitted in inner and outer annular gaps in between the upper yoke 47 and the lower yoke 49. The O-rings 65 and 67 prevent the leakage of the magnetic fluid 51, and prevent dust and the like from entering the MR damper 45.

The lower yoke 49 is connected to the head pipe 25, and the upper yoke 47 is connected to the steering crown 11. That is, the lower yoke 49 is connected to the vehicle body, while the upper yoke 47 is connected to the steering bar 17. Consequently, when the steering bar 17 is operated, the magnetic fluid 51 interposed between the upper yoke 47 and the lower yoke 49 produces a resistance according to its viscosity, and this resistance serves as the steering damping force acting on the steering bar 17.

The MR damper 45 described above corresponds to the "damper" in the present preferred embodiment.

The controller 43 will be described in detail with reference to FIG. 4. FIG. 4 is a block diagram showing an outline of the steering damper control apparatus according to the first preferred embodiment.

The controller 43 includes a normal control unit 71, a posture change responsive control unit 73, a damping force adjusting unit 75, and a damper driver 77.

The normal control unit 71 calculates a damping force command value that controls the MR damper 45 in a normal state in which the rear wheel 5 is not in an idle spin. The posture change responsive control unit 73 calculates a damping force command value that controls the MR damper 45 when there is a possibility of posture change with the rear wheel 5 in an idle spin. The damping force adjusting unit 75 controls the damper driver 77 based on a command value of a plurality of damping force command values provided by the normal control unit 71 and the posture change responsive control unit 73. The damper driver 77 outputs a drive current based on the damping force command value to the magnetic field generating coil 53 of the MR damper 45. The normal control unit 69 also outputs a cancellation signal which reduces the damping force of the MR damper 45 to a minimum as described below.

The normal control unit 71 includes a pressure change rate calculating unit 79, a command value output unit 81, a noncontact determining unit 83, and a noncontact-related memory 85.

The pressure change rate calculating unit 79 calculates a pressure change rate of the front suspension 40 based on pressure signals from the suspension pressure sensor 41. The calculated pressure change rate is provided to the command value output unit 81. The command value output unit 81 determines a damping force command value based on a reference table 81a stored beforehand.

Figure 5:
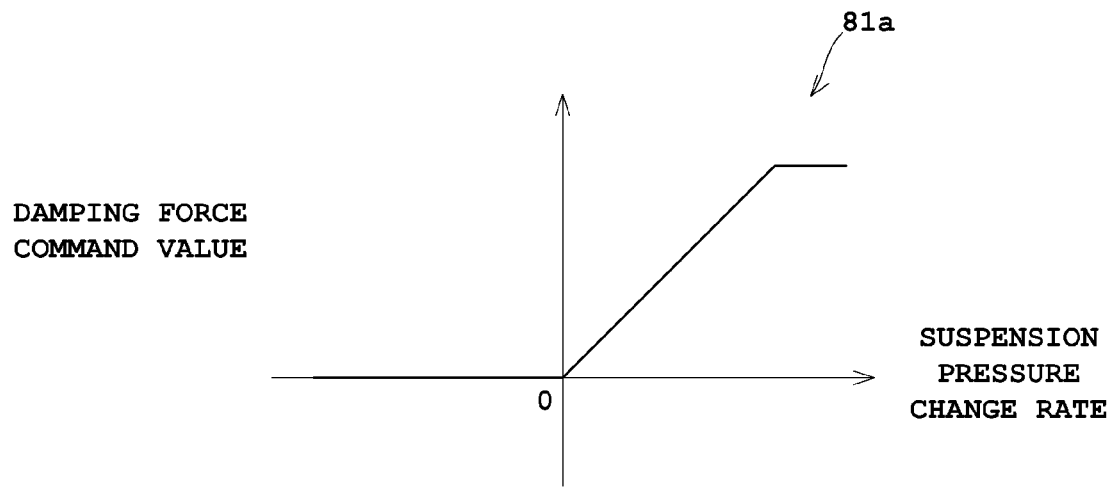
FIG. 5 is a view schematically showing a table used to calculate a damping force command value based on a suspension pressure change rate.

Reference is now made to FIG. 5. FIG. 5 is a view schematically showing a table used to calculate a damping force value based on the suspension pressure change rate.

When the pressure change rate is zero, it indicates that the motorcycle 1 is traveling steadily. When traveling on a flat road, for example, it shows a stable state where the front suspension 40 is contracted to a certain extent, and there occurs no additional contractions or extensions. When the pressure change rate is negative, it indicates that the contracted front suspension 40 is extending. On the other hand, when the pressure change rate is positive, it indicates that the extended front suspension 40 is contracting.

The table used to calculate a damping force value 81a has been set beforehand as follows. For a range of suspension change rates from negative to 0, the damping force command value is set to a minimum. That is, when the front suspension 40 is stable with no contraction or extension, or is extending from a contracted state, the damping force command value is set to a minimum to allow the steering bar 17 to be turned easily. When the suspension change rates are in a positive range exceeding 0, the damping force command value is gradually increased at a constant rate. That is, when the front suspension 40 is contracting from an extended state, the damping force command value is enlarged to render the steering bar 17 more difficult to turn. When the suspension change rate exceeds a fixed value, the damping force command value is fixed to a maximum. The command value output unit 81 outputs a damping force command value to the damping force adjusting unit 75 based on a suspension change rate provided by the pressure change rate calculating unit 79 and the above-mentioned table used to calculate a damping force value 81a.

The noncontact determining unit 83 determines whether the front wheel 3 is in contact with the ground surface based on an output of the suspension pressure sensor 41 indicating a pressure of the front suspension 40. At this time, it refers to the noncontact-related memory 75. This noncontact-related memory 75 includes, stored therein beforehand, a lower limit of pressure and a predetermined time for determining noncontact. The noncontact determining unit 83 monitors a pressure signal of the suspension pressure sensor 41, and determines noncontact of the front wheel 3 based on whether the pressure signal is at the lower limit of pressure for the predetermined time. This is done in order to determine whether the rider of the motorcycle 1 is jumping intentionally. When the motorcycle 1 is jumped intentionally, the front wheel 3 is in a noncontact state for a long time compared with a time of normal traveling. Then, the front suspension 40 is extended to a maximum extent, and the pressure of the suspension 40 maintains a certain value for a fixed period of time. This is determined from the lower limit of pressure and the predetermined time. When a determination suggesting noncontact is occurring, the noncontact determining unit 83 outputs a cancellation signal to the damping force adjusting unit 75.

The suspension pressure sensor 41 described above corresponds to the "pressure detecting device" in the present preferred embodiment. The noncontact-related memory 85 corresponds to the "pressure lower limit storage device" in the present preferred embodiment. The noncontact determining unit 83 corresponds to the "front wheel noncontact determining device" in the present preferred embodiment.

The posture change responsive control unit 73 includes a rotational frequency difference calculating unit 87 and a command value output unit 89.

The rotational frequency difference calculating unit 87 calculates a difference between the rotational frequencies of the front wheel 3 and rear wheel 5 based on the outputs of the front wheel speed sensor 31 and rear wheel speed sensor 35. The calculated rotational frequency difference is provided to the command value output unit 89. The command value output unit 89 determines a damping force command value based on the absolute value of the rotational frequency difference and a table used to calculate a damping force value 89a stored beforehand.

Figure 6:
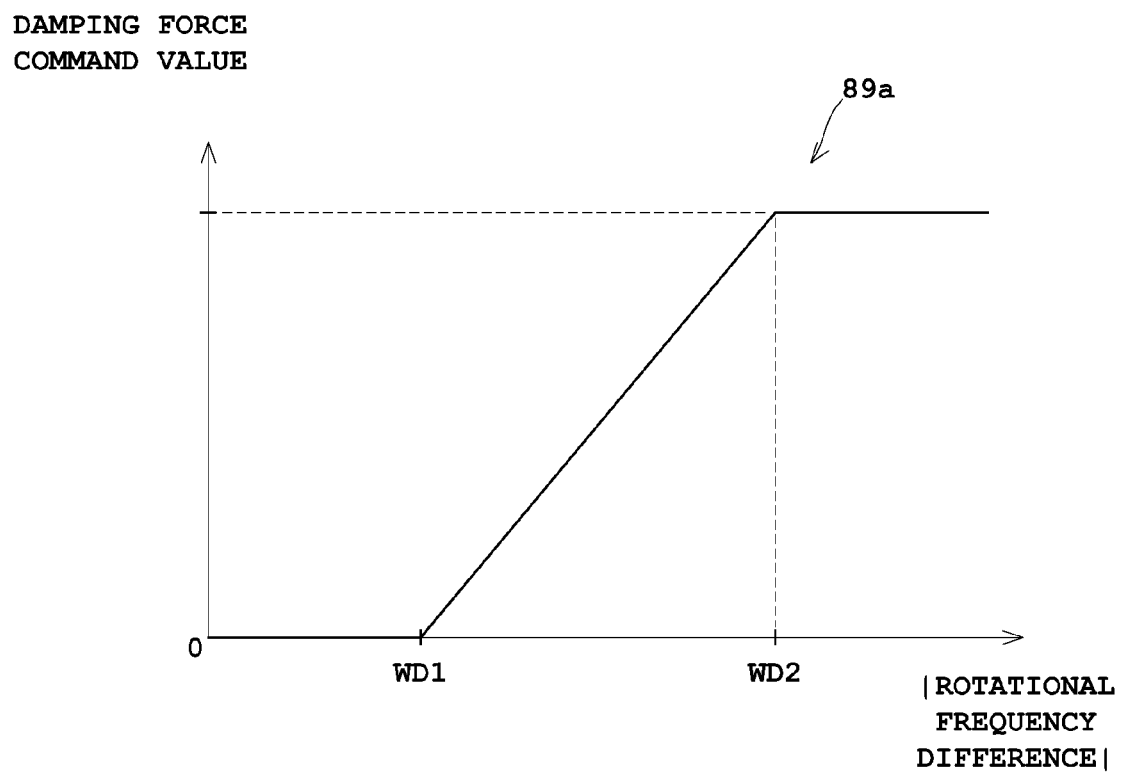
FIG. 6 is a view schematically showing a table used to calculate a damping force command value based on the absolute value of a rotational frequency difference.

Reference is now made to FIG. 6. FIG. 6 is a view schematically showing a table used to calculate a damping force value based on the absolute value of a rotational frequency difference.

The "absolute value" of the rotational frequency difference is used as a criterion for judgment in order to cope with both the case of the rear wheel 5 spinning idly during acceleration of the motorcycle 1 and the case of the rear wheel 5 being locked and spinning idly. When the absolute value of the rotational frequency difference is zero, it indicates that the wheel speeds of the front wheel 3 and rear wheel 5 are the same and the rear wheel 5 is not in an idle spin. When the absolute value of the rotational frequency difference reaches a certain amount, it indicates that the rotational frequency difference between the front wheel 3 and the rear wheel 5 has become large, and that the rear wheel 5 has started a slight idle spin. When the absolute value of the rotational frequency difference becomes larger, it indicates that the rear wheel 5 has started a significant idle spin.

The table used to calculate a damping force value 81a is set beforehand as follows. Up to a certain amount of the absolute value of the rotational frequency difference, even if the rear wheel 5 has started spinning idly, the rear wheel 5 will hardly cause such a posture change as to move to a large extent sideways about the head pipe 25. Therefore, the damping force command value is maintained at zero until the absolute value of the rotational frequency difference reaches the certain amount. And when the absolute value of the rotational frequency difference becomes larger, the idle spin of the rear wheel 5 will exert a great influence on the posture change of the motorcycle 1. Specifically, the rear wheel 5 moves sideways to a great extent such that the drive of the rear wheel 5 will begin to deviate greatly from the traveling direction. So, when the absolute value of the rotational frequency difference reaches a first threshold value WD1, the damping force command value is raised at a constant rate to a second threshold value WD2. Consequently, the damping force of the MR damper 45 is progressively increased with the idle spin of the rear wheel 5. As a result, it prevents the rear wheel 5 deviating to a large extent sideways. And when the absolute value of the rotational frequency difference reaches or exceeds the second threshold value WD2, the damping force command value is set to a maximum. In this manner, the command value output unit 89 outputs the damping force command value to the damping force adjusting unit 75 based on the absolute value of the rotational frequency difference provided by the rotational frequency difference calculating unit 87 and the above table used to calculate a damping force value 89a.

The damping force adjusting unit 75 receives the damping force command value from the normal control unit 71, the cancellation signal from the normal control unit 71, and the damping force command value from the posture change responsive control unit 73. The damping force adjusting unit 75 provides one of the two damping force command values to the damper driver 77 based on an idle spin detection flag which will be described below. On the other hand, when the cancellation signal is received, the damping force command value provided to the damper driver 77 at this time is cancelled, and the minimum damping force command value is provided to the damper driver 77. The damper driver 77 outputs an electric current value corresponding to the damping force command value to the magnetic field generating coil 53 of the MR damper 45.

The front wheel speed sensor 31, rear wheel speed sensor 35, rotational frequency difference calculating unit 87, and command value output unit 89 correspond to the "idle spin detecting device" in the present preferred embodiment. The damper driver 77 corresponds to the "damping force adjusting device" in the present preferred embodiment. The front wheel speed sensor 31 corresponds to the "front wheel rotational frequency detecting device" in the present preferred embodiment. The rear wheel speed sensor 35 corresponds to the "rear wheel rotational frequency detecting device" in the present preferred embodiment. The rotational frequency difference calculating unit 87 corresponds to the "difference calculating device" in the present preferred embodiment. The command value output unit 89 corresponds to the "distinguishing device" and the "storage device" in the present preferred embodiment. The first threshold value WD1 and second threshold value WD2 in the table used to calculate a damping force value 89a noted above correspond to the "first threshold value" and the "second threshold value" in the present preferred embodiment.

Figure 7:
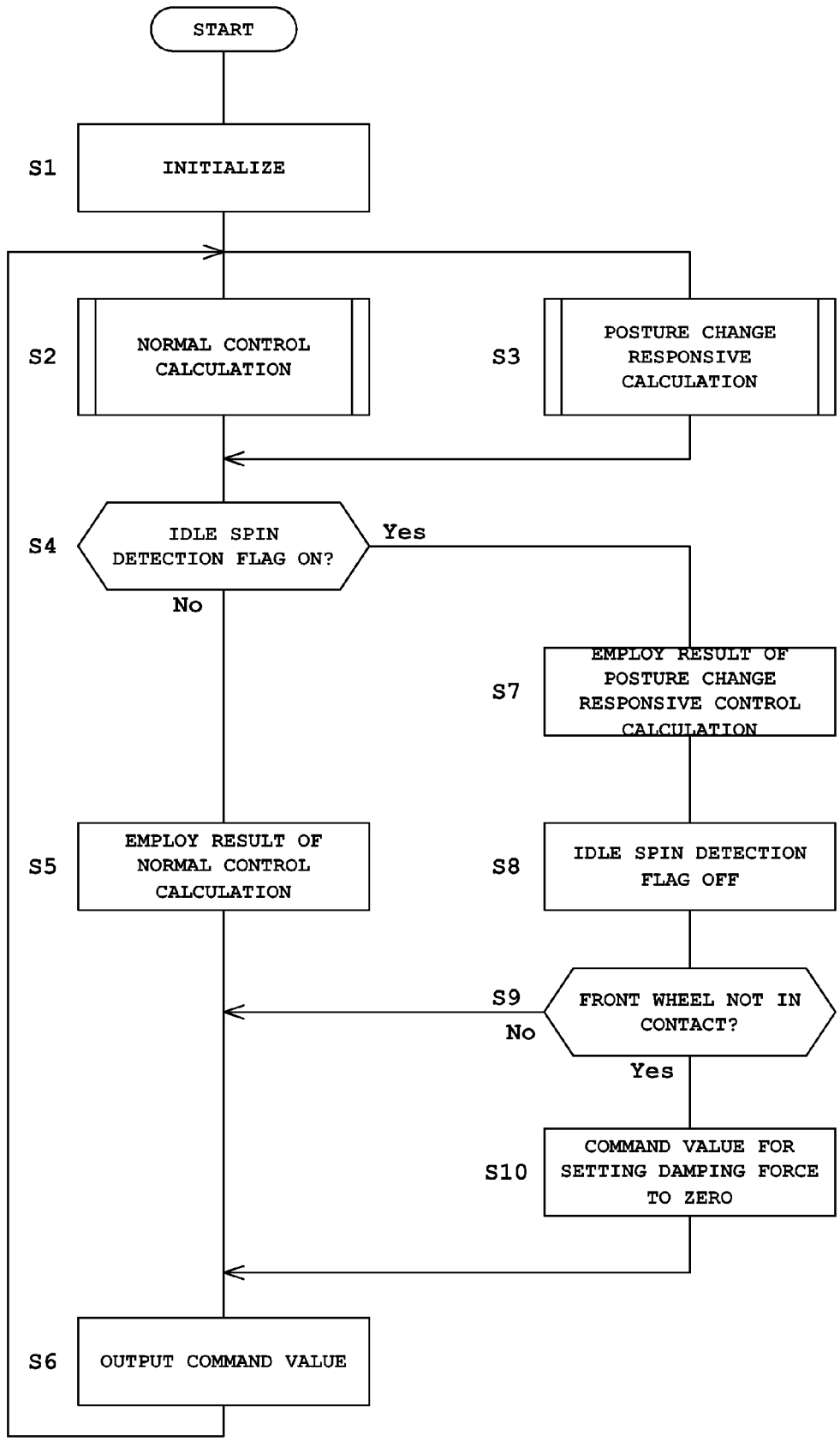
FIG. 7 is a flow chart showing operation of the steering damper control apparatus.
Figure 8:
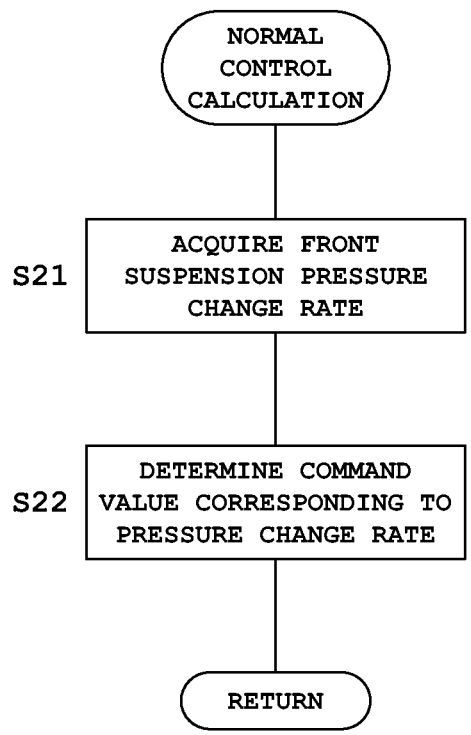
FIG. 8 is a flow chart showing operation of a normal control calculation.
Figure 9:
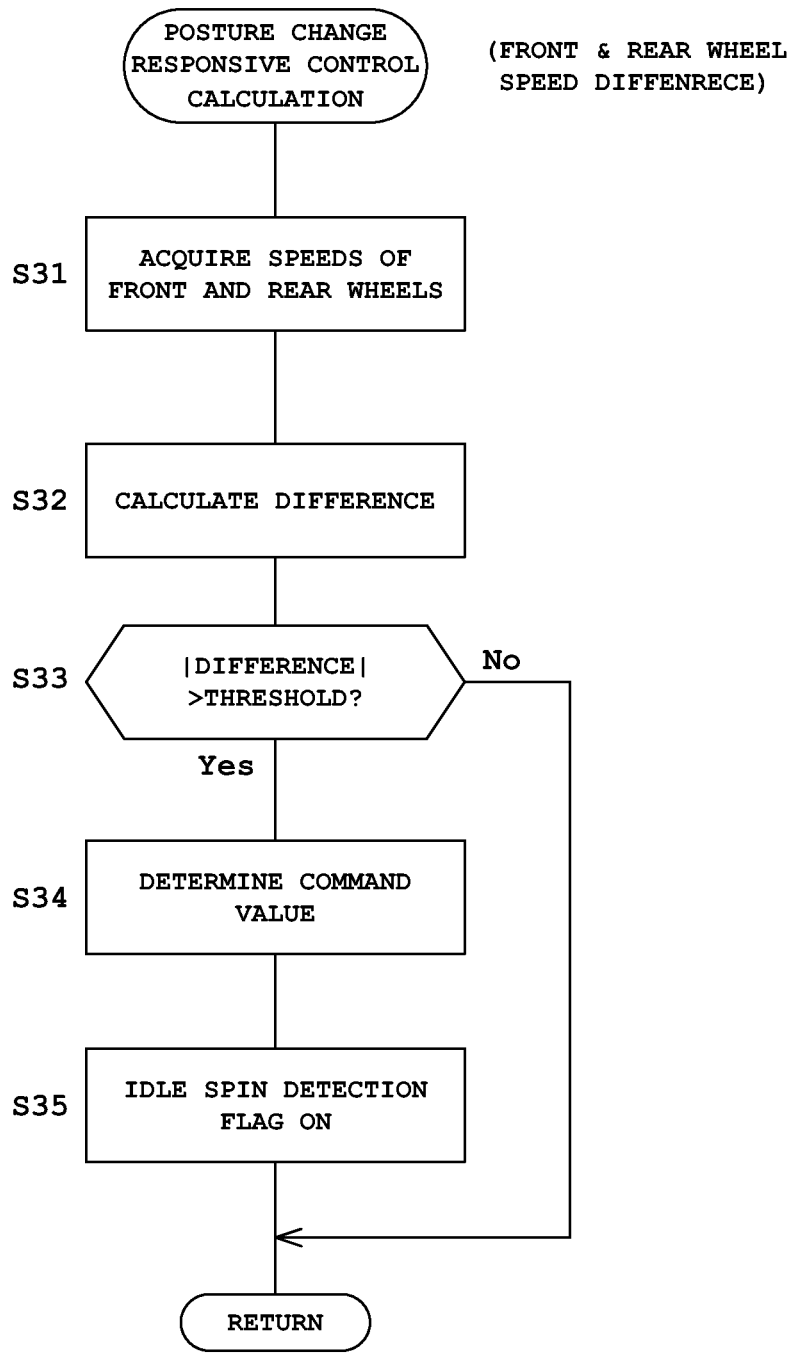
FIG. 9 is a flow chart showing operation of a posture change responsive control calculation.

Operations will be described with reference to FIGS. 7-9. FIG. 7 is a flow chart showing an operation of the steering damper control apparatus. FIG. 8 is a flow chart showing an operation of a normal control calculation. FIG. 9 is a flow chart showing an operation of a posture change responsive control calculation.

Step S1

The controller 43 is initialized. Specifically, the damping force command value to be provided to the damping force adjusting unit 75 is set to a minimum value zero. This places the MR damper 45 in a state of producing no damping force.

Step S2

An arithmetic processing for normal control is carried out.

Reference is now made to FIG. 8.

Steps S21, S22

The normal control unit 71 acquires pressures of the front suspension 40 from the suspension pressure sensor 41. And a damping force command value is determined based on the pressure change rate from the pressure change rate calculating unit 79, and the table used to calculate a damping force value 81a described above.

Step S3

In parallel with the above normal control, a posture change responsive control calculation is carried out.

Reference is now made to FIG. 9.

Steps S31, S32

The rotational frequency difference calculating unit 87 receives signals from the front wheel speed sensor 31 and the rear wheel speed sensor 35, and calculates a difference between the speeds of the front wheel 3 and rear wheel 5.

Steps S33-S35

The command value output unit 89 branches the process based on the absolute value of the difference between the rotational frequencies of the front and rear wheels and the table used to calculate a damping force value 89a. Specifically, the process is branched based on whether or not the absolute value of the rotational frequency difference exceeds the first threshold value WD1. When the first threshold value WD1 is not exceeded, branching is made to step S4 in FIG. 7. On the other hand, when the first threshold value WD1 is exceeded, a damping force command value is determined based on the absolute value of the rotational frequency difference and the table used to calculate a damping force value 89a. After turning the idle spin detection flag ON, which indicates that an idle spin has been detected, the process returns to step S4 in FIG. 7.

Reference is now made back to FIG. 7.

Step S4

The process is branched according to the state of the idle spin detection flag. Specifically, when the idle spin detection flag is ON, the process branches to step S7. When the idle spin detection flag is OFF, it branches to step S5. The case of the idle spin detection flag being OFF will be described first.

Step S5

Since the idle spin detection flag is OFF, the rear wheel 5 is not in an idle spin, or if any, it is a slight idle spin not causing a posture change. Then, in this case, the damping force command value of the normal control unit 71 is used.

Step S6

The damping force adjusting unit 75 provides the damping force command value used at this time to the damper driver 77.

Next, the case of the idle spin detection flag being ON will be described.

Steps S7, S8

Since the idling detection flag is ON, the rear wheel 5 is spinning idly which influences a posture change. Then, in this case, the damping force command value of the posture change responsive control unit 73 is used. And the idle spin detection flag is turned OFF.

Steps S9, S10

When the front wheel 3 is in a state of noncontact and the cancellation signal is outputted from the noncontact determining unit 83, a minimum value zero is used as the damping force command value. Consequently, when the rider of the motorcycle 1 makes a jump intentionally, the steering bar 17 can be turned with ease. When the front wheel 3 is in contact with the ground and the cancellation signal is not outputted from the noncontact determining unit 83, the process moves to step S6.

When the command value output unit 89 detects an idle spin of the rear wheel 5, the steering damper control apparatus in the present preferred embodiment causes the damper driver 77 to make the damping force of the MR damper 45 higher than the damping force used when the rear wheel 5 is not in an idle spin. Therefore, the rear wheel 5 is prevented from skidding sideways about the head pipe 25, thus preventing a posture change of the motorcycle 1. As a result, it prevents the drive of the rear wheel 5 from deviating from the traveling direction, thus efficiently using the drive of the rear wheel 5 during traveling.

Based on the rotational frequencies from the front wheel 3 and rear wheel 5, the rotational frequency difference calculating unit 87 calculates a difference in rotational frequencies between the front and rear wheels. When this difference is large, it indicates that the rear wheel 5 is in an idle spin. The command value output unit 89 can distinguish the idle spin based on the difference. Since the idle spin is distinguished based on a rotational frequency difference between the front and rear wheels, there is an advantage of being able to prevent a false detection of an idle spin even when a gear slipout occurs in the engine 7.

The first threshold value WD1 is stored beforehand in the table used to calculate a damping force value 89a to enable the command value output unit 89a to distinguish the occurrence of an idle spin based on this first threshold value WD1 and the difference. By setting the first threshold value WD1 appropriately, the timing of increasing the damping force of the MR damper 45 can be adjusted. Therefore, the controllability of the motorcycle 1 can be adjusted.

As shown in the table used to calculate a damping force value 89a, the damping force of the MR damper 45 is increased with the force command value according to the rotational frequency difference from the first threshold value WD1 to the second threshold value WD2. This, while preventing posture change, also reduces the possibility of giving the rider an unnatural feeling.

By setting the second threshold value WD2 appropriately to the table used to calculate a damping force value 89a, the timing of increasing the damping force of the MR damper 45 to a maximum can be adjusted. Therefore, the controllability of the motorcycle 1 can be adjusted.

When an idle spin of the rear wheel 5 is not detected, the damping force command value of the normal control unit 71 is used. That is, the MR damper 45 is controlled using the damping force command value determined based on a detection result of the suspension pressure sensor 41. This produces a damping force when steering vibration such as a kickback can easily occur, to make the steering bar 17 hard to rotate. As a result, steering vibration can be conveniently prevented. Even if the steering device is not actually shaken, steering vibration can be prevented.

The command value output unit 81, since it determines the damping force command value based on the pressure change rate, can appropriately determine the damping force command value corresponding to extension and contraction of the front suspension 40. More particularly, the pressure of the front suspension 40 will change not only with extension and contraction of the front suspension 40 but also with temperature variations and "air intake". However, the pressure change by temperature variations or "air intake" is a slow change that takes a relatively long time. On the other hand, the pressure change by extension and contraction of the front suspension 40 is a momentary change that takes a relatively short time. Therefore, the pressure change rate calculated by the pressure change rate calculating unit 79 is not easily changeable by temperature variations of the front suspension 40 or pressure variations due to "air intake". In other words, the pressure change rate always has a value properly reflecting only extension and contraction of the front suspension 40. Incidentally, in the first preferred embodiment, the pressure change rate calculating unit 79 calculates the pressure change rate with high frequency (e.g. in cycles of about 0.1 [msec]-about 50 [msec], for example) based on the pressure signals of the suspension pressure sensor 41. Therefore, the command value output unit 81 can appropriately determine the damping force command value corresponding to extension and contraction of the front suspension 40.

The temperature variations of the front suspension 40 noted above occur according to variations in ambient temperature and traveling conditions. For example, the oil in the front suspension 40 is agitated by vibration occurring at traveling times, which also passes through an orifice, to raise the temperature of the oil and to raise the temperature of the front suspension 40 as a whole. The "air intake" noted above is a phenomenon in which ambient air is drawn into the front suspension 40.

In the table used to calculate a damping force value 81a, when the pressure change rate is positive, the damping force command value is larger than the minimum. Therefore, a damping force is generated while the front suspension 40 is contracting, thus conveniently preventing steering vibration.

In the range of the pressure change rate being from 0 to a fixed value, the damping force command value increases progressively with the pressure change rate. Therefore, even when the pressure of the front suspension 40 increases sharply, steering vibration can be effectively prevented.

In the above range, the damping force command value increases at a constant rate as the pressure change rate becomes large. That is, the damping force increases in proportion to the pressure change rate. Therefore, steering vibration can be effectively prevented with an increased effect.

When the pressure change rate exceeds the fixed value (threshold value), the damping force command value is a fixed value. Therefore, since no excessive damping force more than necessary is generated, the rider's burden is conveniently eased.

The fixed value of the damping force command value is equal to the damping force command value when the pressure change rate is at the threshold value. Therefore, when the pressure change rate increases from a value lower than the threshold value to a value higher than the threshold value, or when it decreases from a value higher than the threshold value to a value lower than the threshold value, the amount of the damping force does not change suddenly. This can avoid an unnatural change in steering controllability (ease of movement).

When the pressure change rate is negative, the damping force command value is at a minimum. Therefore, the damping force is larger than the minimum only when the pressure of the front suspension 40 is increasing, and the damping force is the minimum at other times to render the steering bar 17 easily rotatable. This conveniently prevents lowering of the steering controllability while preventing steering vibration. When making the motorcycle 1 jump, the rider can turn the steering bar 17 easily.

The MR damper 45 includes the magnetic fluid 51 and the magnetic field generating coil 53 that applies a magnetic field to the magnetic fluid 51. Therefore, an electric current flowing through the magnetic field generating coil 53 can cause the MR damper 45 to generate a damping force. Therefore, even if the steering device is not actually shaken, a damping force can be generated conveniently when the steering device has become easily shaken.

The MR damper 45 generates a damping force with the shearing force of the magnetic fluid 51. That is, the MR damper 45 is what is called the "shear type". Therefore, when the damping force command value is reduced to the minimum, the damping force can be made as small as possible. This makes the feeling of steering control even lighter, thus preventing a lowering of the steering controllability with an increased effect.

Compared with a stroke sensor or the like, the suspension pressure sensor 41 is compact, and can be set easily to a desired position. The suspension pressure sensor 41 has high durability compared with the stroke sensor or the like. The pressure of the front suspension 40 corresponds to a load acting on the front wheel 3. That is, with the suspension pressure sensor 41, information relating to the load on the front wheel 3 can be detected conveniently. Incidentally, the pressure change rate of the front suspension 40 corresponds to a rate of change of the load acting on the front wheel.

Next, a second preferred embodiment of the present invention will be described with reference to the drawings.

Figure 10:
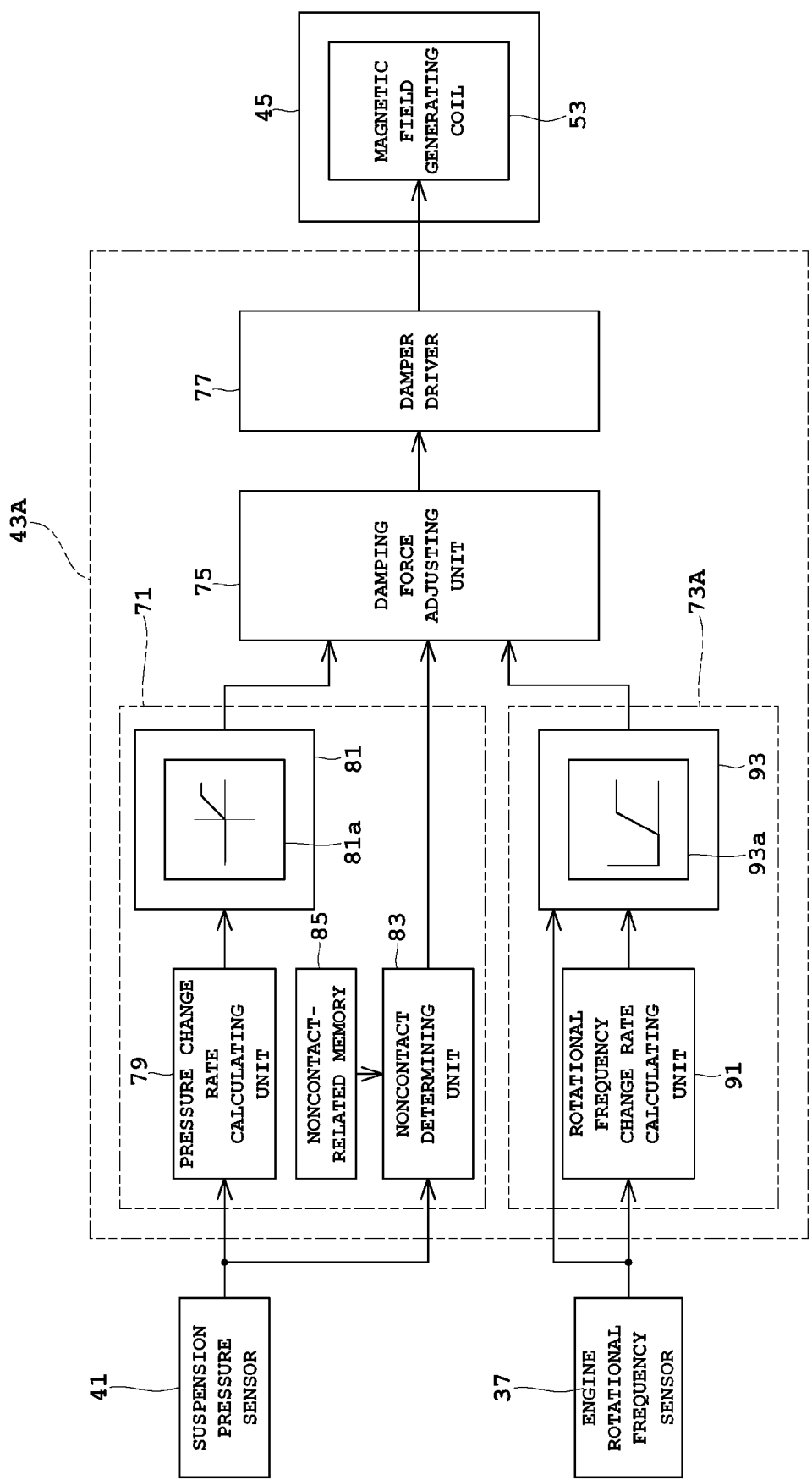
FIG. 10 is a block diagram showing an outline of a steering damper control apparatus according to a second preferred embodiment of the present invention.

FIG. 10 is a block diagram showing an outline of a steering damper control apparatus according to a second preferred embodiment. Like reference signs are affixed to like components which are the same as in the foregoing first preferred embodiment and will not particularly be described.

The controller 43A according to the second preferred embodiment 2 includes the normal control unit 71, a posture change responsive control unit 73A, the damping force adjusting unit 75, and the damper driver 77. The posture change responsive control unit 73A is different from that in the foregoing first preferred embodiment.

The posture change responsive control unit 73A includes a rotational frequency change rate calculating unit 91 and a command value output unit 93.

The rotational frequency change rate calculating unit 91 of the posture change responsive control unit 73A calculates a change rate of the rotational frequency of the engine 7 based on the outputs of the engine rotational frequency sensor 37. Specifically, moving average deviations of engine rotational frequencies successively outputted from the engine rotational frequency sensor 37 are calculated, and differences thereof from current engine frequencies are calculated to obtain the change rate. The change rate of the rotational frequency is provided to the command value output unit 93. The command value output unit 93 determines a damping force command value based on the absolute value of the rotational frequency rate and a table used to calculate a damping force value 93a stored beforehand.

The command value output unit 93 is programmed to detect an over-rotation of the engine 7. For example, the command value output unit 93 is provided a signal corresponding to the ignition pulse, and by monitoring this ignition pulse, can determine whether the engine 7 is in an over-rotation state. Specifically, when the engine 7 comes into an over-rotation state, ignition control is carried out to reduce the ignition pulses. Therefore, by monitoring the ignition pulse, whether the engine 7 has come into an over-rotation state is determined. The command value output unit 93 sets the damping force command value to a maximum when an over-rotation state is detected regardless of the rotational frequency change rate.

Figure 11:
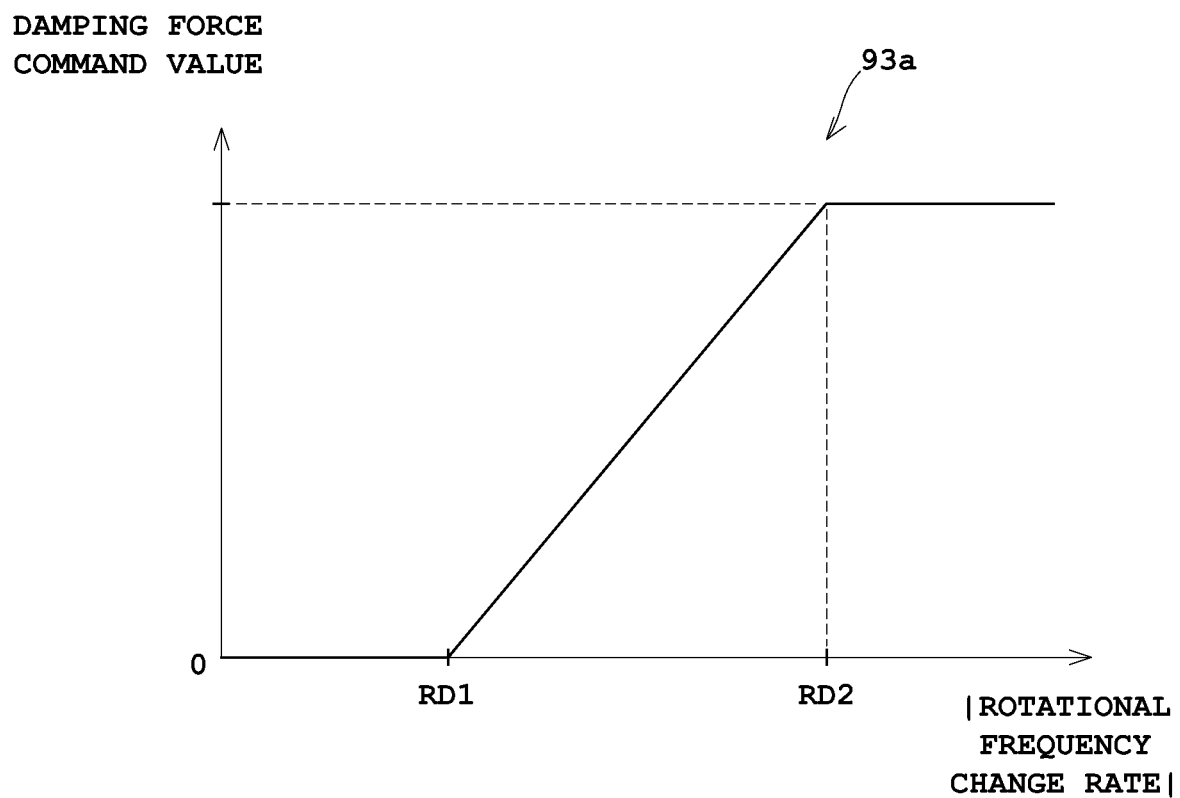
FIG. 11 is a view schematically showing a table used to calculate a damping force command value based on the absolute value of a rotational frequency change rate.

Reference is now made to FIG. 11. FIG. 11 is a view schematically showing a table used to calculate a damping force value based on the absolute value of the rotational frequency change rate.

The "absolute value" of the rotational frequency change rate is used as a criterion for judgment in order to cope with both acceleration and deceleration of the motorcycle 1. When the absolute value of the rotational frequency change rate is zero, it indicates that the vehicle is traveling at a constant speed. When the absolute value of the rotational frequency change rate reaches a certain amount, it indicates that the grip of the rear wheel 5 has begun to be exceeded and the rear wheel 5 has started a slight idle spin. When the absolute value of the rotational frequency change rate becomes larger, it indicates that the rear wheel 5 has started a significant idle spin.

The table used to calculate a damping force value 93a has been set beforehand as follows.

Up to a certain amount of the absolute value of the rotational frequency change rate, even if the rear wheel 5 has started spinning idly, the rear wheel 5 will hardly cause such a posture change as to move to a large extent sideways about the head pipe 25. Therefore, the damping force command value is maintained at zero until the absolute value of the rotational frequency change rate reaches the certain amount. And when the absolute value of the rotational frequency change rate becomes larger, the idle spin of the rear wheel 5 will exert a great influence on the posture change of the motorcycle 1. Specifically, the rear wheel 5 moves to a great extent sideways such that the drive direction of the rear wheel 5 will begin to deviate greatly from the traveling direction. So, when the absolute value of the rotational frequency change rate reaches a first threshold value RD1, the damping force command value is raised gradually from hereto a second threshold value RD2. Consequently, the damping force of the MR damper 45 is progressively increased with the idle spin of the rear wheel 5. As a result, it prevents the rear wheel 5 from deviating to a large extent sideways. And when the absolute value of the rotational frequency change rate reaches or exceeds the second threshold value RD2, the damping force command value is fixed to a maximum. In this manner, the command value output unit 93 outputs the damping force command value to the damping force adjusting unit 75 based on the absolute value of the rotational frequency change rate provided from the rotational frequency change rate calculating unit 91 and the table used to calculate a damping force value 93a.

The engine rotational frequency sensor 37, rotational frequency change rate calculating unit 91, and command value output unit 93 correspond to the "idle spin detecting device" in the present preferred embodiment. The engine rotational frequency sensor 37 corresponds to the "engine rotational frequency detecting device" in the present preferred embodiment. The rotational frequency change rate calculating unit 91 corresponds to the "increase rate calculating device" in the present preferred embodiment. The command value output unit 93 corresponds to the "distinguishing device" and the "storage device" in the present preferred embodiment. The first threshold value RD1 and second threshold value RD2 in the table used to calculate a damping force value 93a noted above correspond to the "first threshold value" and the "second threshold value" in the present preferred embodiment. The command value output unit 93 corresponds to the "over-rotation detecting device" in the present preferred embodiment.

Figure 12:
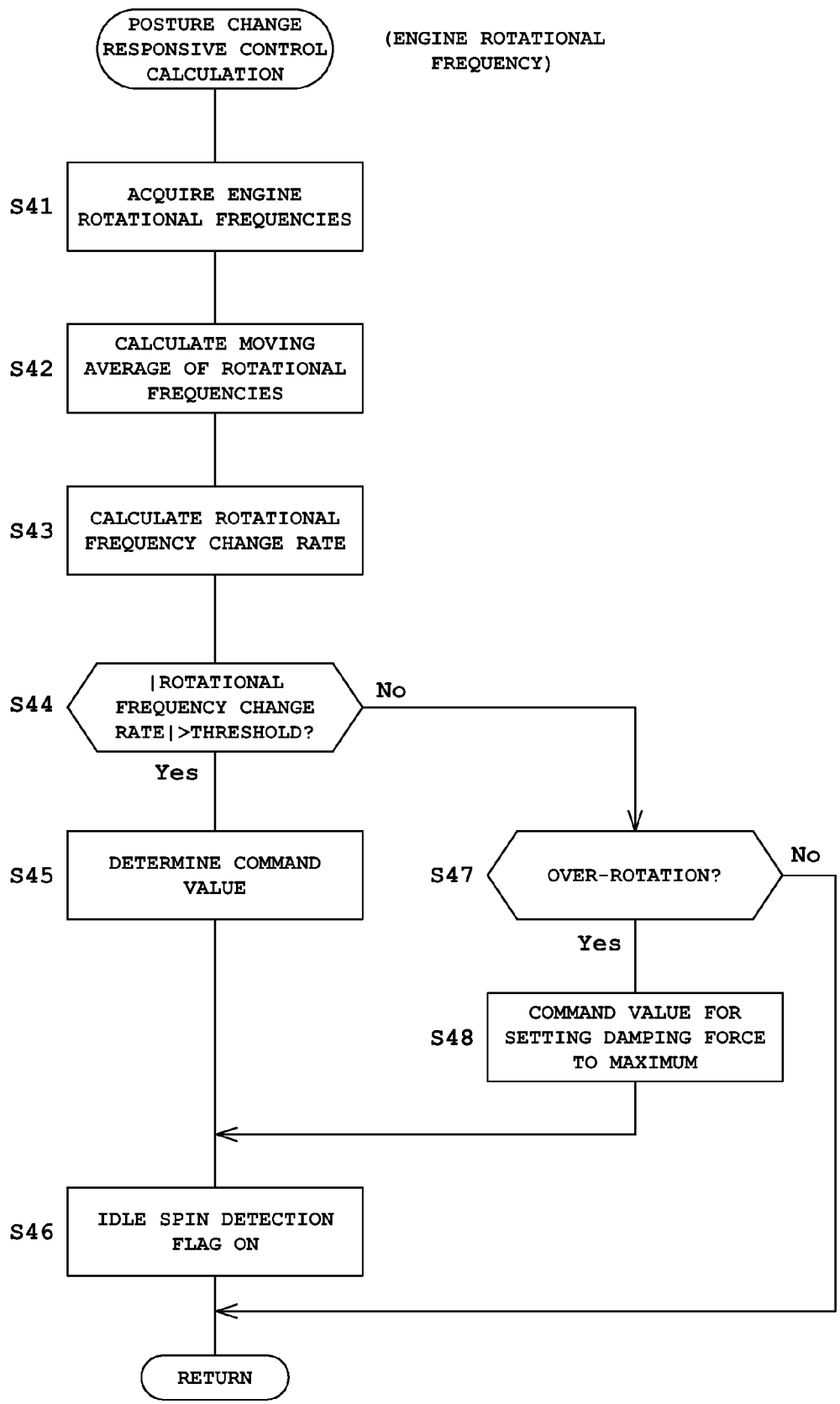
FIG. 12 is a flow chart showing operation of a posture change responsive control calculation.

Operation of the steering damper control apparatus will be described with reference to FIG. 12. FIG. 12 is a flow chart showing operation of the posture change responsive control calculation. Overall operation of the steering damper control apparatus is preferably the same as in the flow chart of FIG. 7 described above, and operation of the normal control calculation is preferably the same as in the flow chart of FIG. 8 described above. Thus, their detailed description is omitted here.

Steps S41-S43

The rotational frequency change rate calculating unit 91 receives rotational frequencies of the engine 7 from the engine rotational frequency sensor 37, calculates moving averages, and thereafter calculates a rotational frequency change rate based on differences between the moving averages and current rotational frequencies.

Steps S44-S46

The command value output unit 93 branches the process based on the absolute value of the rotational frequency change rate and the table used to calculate a damping force value 93a. Specifically, the process is branched based on whether or not the absolute value of the rotational frequency change rate exceeds the first threshold value RD1. When the first threshold value RD1 is exceeded, a damping force command value is determined based on the absolute value of the rotational frequency change rate and the table used to calculate a damping force value 93a. After turning the idle spin detection flag ON which indicates that an idle spin has been detected, the process returns to step S4 in FIG. 7.

Steps S47, S48

On the other hand, when the absolute value of the rotational frequency change rate does not exceed the first threshold value RD1, the command value output unit 93 determines whether the engine 7 is in an over-rotation state, and branches the process. Specifically, when it is determined to be in an over-rotation state, after setting the damping force command value to a maximum, the process moves to step S46. On the other hand, when it is determined not to be in an over-rotation state, the process returns to step S4 in FIG. 7.

According to the steering damper control apparatus in the present preferred embodiment, as in the first preferred embodiment described above, drive of the rear wheel 5 is prevented from deviating from a traveling direction, thus efficiently using the drive of the rear wheel 5 during traveling.

Based on the rotational frequencies of the engine 7 from the engine rotational frequency sensor 37, the rotational frequency change rate calculating unit 91 calculates a rotational frequency increase rate of the engine 7. When this rotational frequency increase rate is large, it indicates that the rear wheel 5 is in an idle spin. Thus, the command value output unit 93 can determine an idle spin based on the rotational frequency increase rate.

The first threshold value RD1 is stored beforehand in the table used to calculate a damping force value 93a to enable the command value output unit 93a to determine the occurrence of an idle spin based on this first threshold value RD1 and the rotational frequency increase rate. By setting the first threshold value RD1 appropriately, the timing of increasing the damping force of the MR damper 45 can be adjusted. Therefore, the controllability of the motorcycle 1 can be adjusted. Since the damping force of the MR damper 45 is increased according to the rotational frequency increase rate, the possibility of giving the rider an unnatural feeling is prevented or significantly reduced while preventing a posture change of the motorcycle 1.

Further, the second threshold value RD2 is stored beforehand in the table used to calculate a damping force value 93a, and when the absolute value of the rotational frequency increase rate is equal to or higher than the second threshold value RD2, or when the command value output unit 93 detects an over-rotation state of the engine 7, the damper driver 77 increases the damping force of the MR damper 45 to a maximum. Therefore, by appropriately setting the second threshold value RD2, the timing of increasing the damping force of the MR damper 45 to a maximum can be adjusted, thus adjusting the controllability of the motorcycle 1. Even if the rotational frequency increase rate is less than the second threshold value RD2, the rotational frequency of the engine 7 becoming an over-rotation state may be accompanied by an idle spin of the rear wheel 5. So, when the command value output unit 91 detects an over-rotation of the engine 7, even if the rotational frequency increase rate is less than the second threshold value RD2, the damping force of the MR damper 45 is increased to a maximum, thus preventing a posture change of the motorcycle 1 due to the idle spin of the rear wheel 5 with high accuracy.

Next, a third preferred embodiment of the present invention will be described with reference to the drawings.

Figure 13:
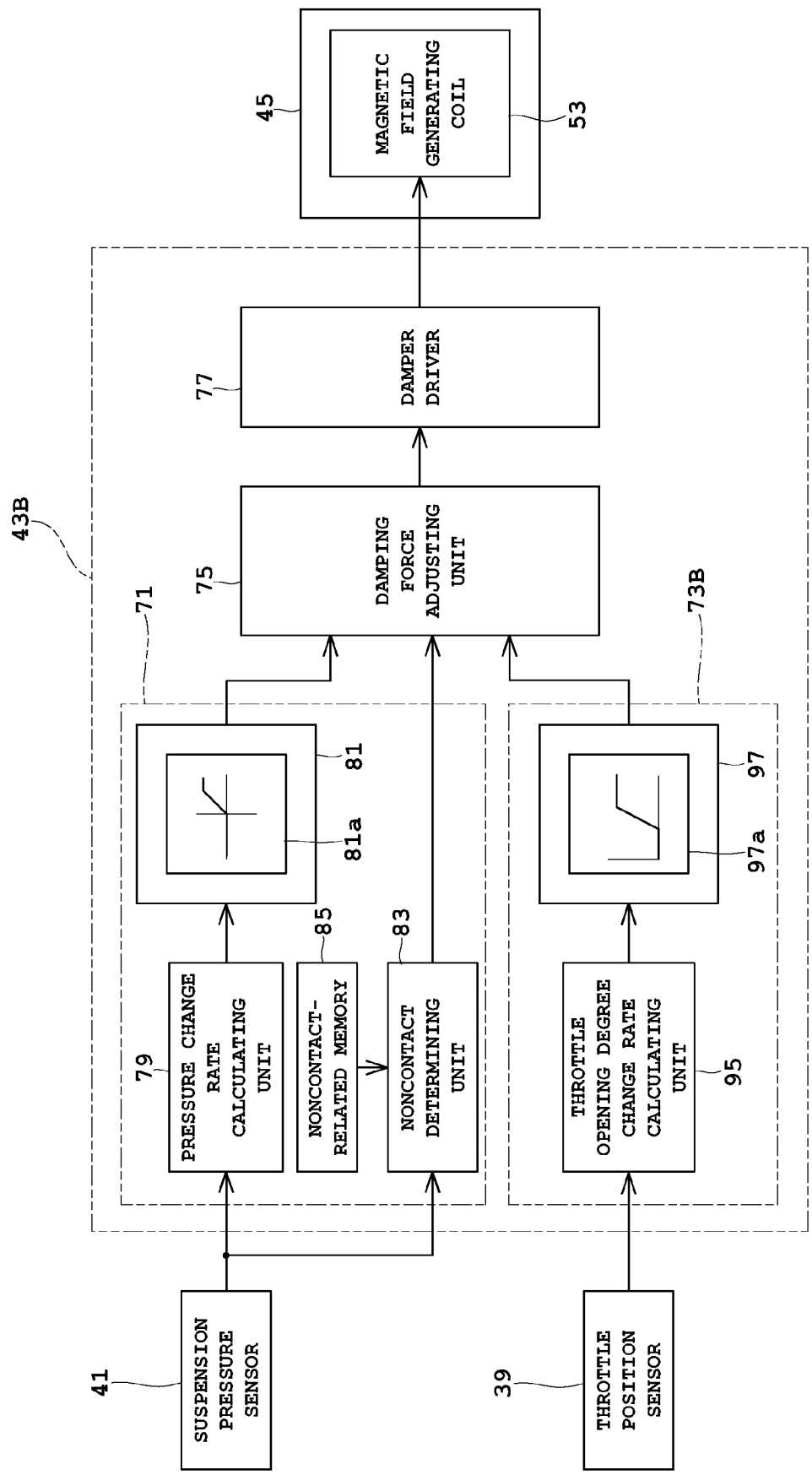
FIG. 13 is a block diagram showing an outline of a steering damper control apparatus according to a third preferred embodiment of the present invention.

FIG. 13 is a block diagram showing an outline of a steering damper control apparatus according to the third preferred embodiment. Like reference signs are affixed to like components which are the same as in the foregoing first preferred embodiment and will not particularly be described.

The controller 43B according to the third preferred embodiment includes the normal control unit 71, a posture change responsive control unit 73B, the damping force adjusting unit 75, and the damper driver 77. The posture change responsive control unit 73B is preferably different from that in the foregoing first preferred embodiment.

A throttle opening degree change rate calculating unit 95 of the posture change responsive control unit 73B calculates a change rate of a throttle opening degree based on outputs of the throttle position sensor 39. The calculated throttle opening degree change rate is provided to a command value output unit 97. The command value output unit 97 determines a damping force command value based on the absolute value of the throttle opening degree change rate and a table used to calculate a damping force value 97a stored beforehand.

Figure 14:
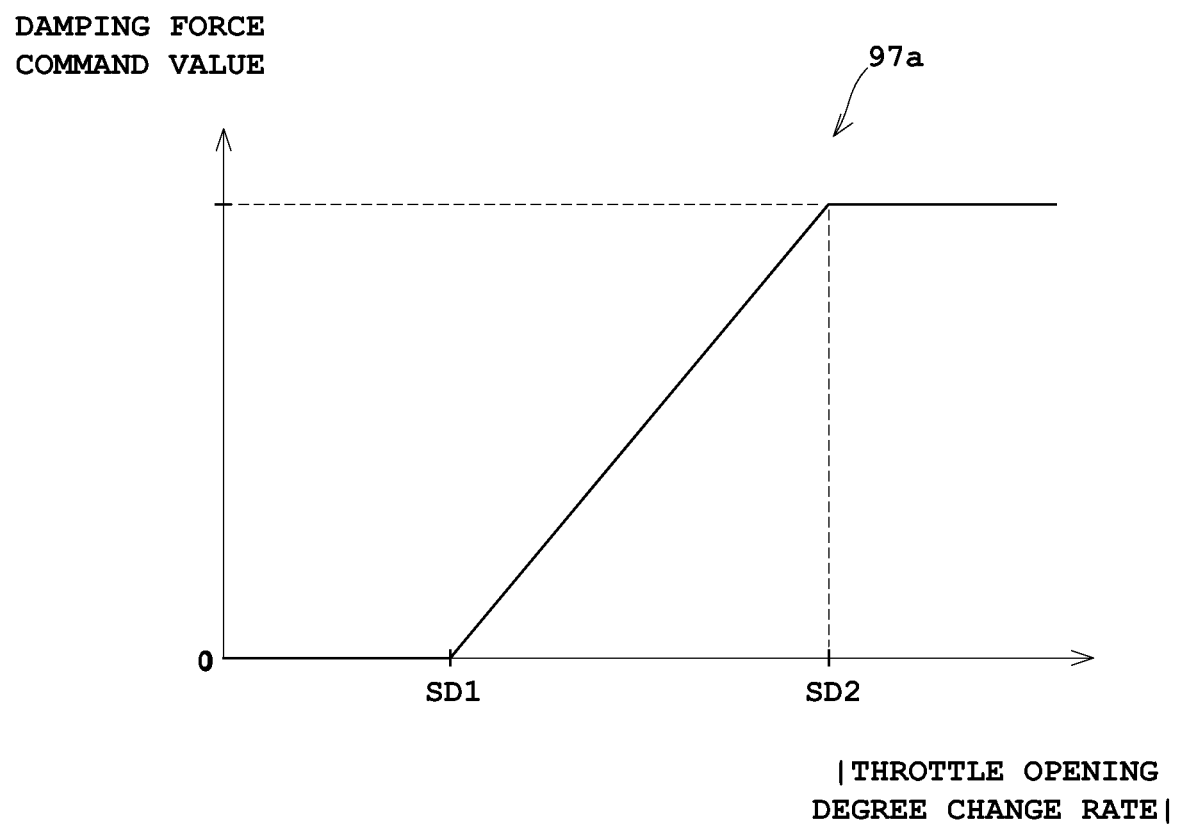
FIG. 14 is a view schematically showing a table used to calculate a damping force command value based on the absolute value of a throttle opening change rate.

Reference is now made to FIG. 14. FIG. 14 is a view schematically showing a table used to calculate a damping force value based on the absolute value of the throttle opening degree change rate.

The "absolute value" of the throttle opening degree change rate is used as a criterion for judgment in order to cope with both acceleration (with the throttle opened) and deceleration (with the throttle closed) of the motorcycle 1. When the absolute value of the throttle opening degree change rate is zero, it indicates that the vehicle is traveling at a constant speed. When the absolute value of the throttle opening degree change rate reaches a certain amount, the engine 7 increases the rotational frequency rapidly, or conversely, decreases the rotational frequency rapidly. So it indicates that the grip of the rear wheel 5 has begun to be exceeded, which gives rise to a possibility of the rear wheel 5 starting a slight idle spin. When the absolute value of the throttle opening degree change rate becomes larger, it indicates a possibility of the rear wheel 5 starting a significant idle spin.

The table used to calculate a damping force value 97a has been set beforehand as follows.

Up to a certain amount of the throttle opening degree change rate, even if the rear wheel 5 has started to spin idly, the rear wheel 5 will hardly cause such a posture change to move to a large extent sideways about the head pipe 25. Therefore, the damping force command value is maintained at zero until the absolute value of the throttle opening degree change rate reaches the certain amount. When the absolute value of the throttle opening degree change rate becomes larger, the idle spin of the rear wheel 5 will exert a great influence on the posture change of the motorcycle 1. Specifically, there is a possibility that the rear wheel 5 moves to a great extent sideways such that the driving direction of the rear wheel 5 will begin to deviate greatly from the traveling direction. So, when the absolute value of the throttle opening degree change rate reaches a first threshold value SD1, the damping force command value is raised at a constant rate to a second threshold value SD2. Consequently, the damping force of the MR damper 45 is progressively increased with the possibility of an idle spin of the rear wheel 5. As a result, it prevents the rear wheel 5 from deviating to a large extent sideways. And when the absolute value of the throttle opening degree change rate reaches or exceeds the second threshold value SD2, the damping force command value is set to a maximum. In this manner, the command value output unit 97 outputs the damping force command value to the damping force adjusting unit 75 based on the absolute value of the throttle opening degree change rate provided from the throttle opening degree change rate calculating unit 95 and the above table used to calculate a damping force value 97a.

The above throttle position sensor 39, throttle opening degree change rate calculating unit 95, and command value output unit 97 correspond to the "idle spin detecting device" in the present preferred embodiment. The throttle opening degree change rate calculating unit 95 corresponds to the "change rate calculating device" in the present preferred embodiment. The command value output unit 97 corresponds to the "presuming device" and the "storage device" in the present preferred embodiment. The first threshold value SD1 and second threshold value SD2 in the table used to calculate a damping force value 97a noted above correspond to the "first threshold value" and the "second threshold value" in the present preferred embodiment.

Figure 15:
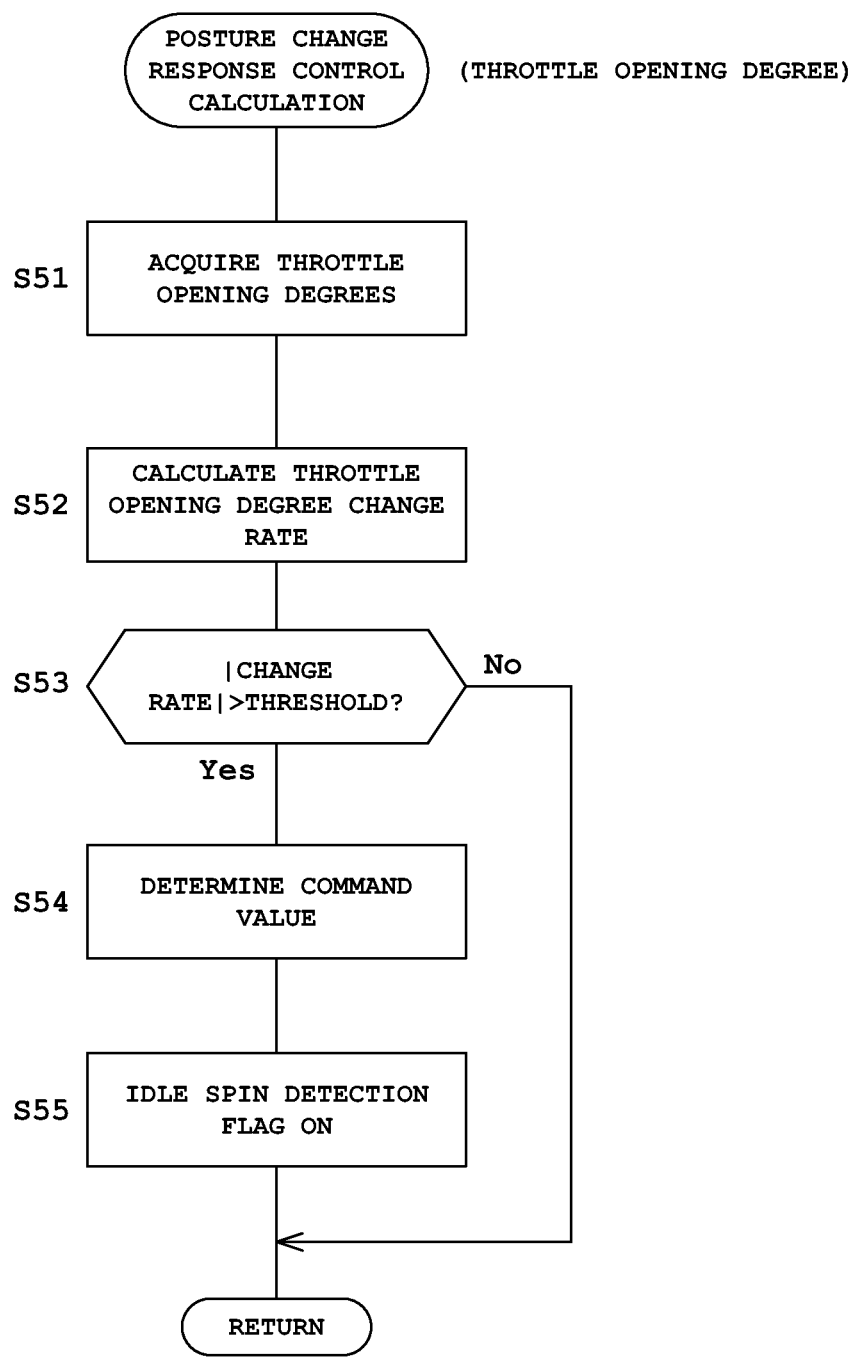
FIG. 15 is a flow chart showing a posture change responsive control calculation.

Operation of the steering damper control apparatus will be described with reference to FIG. 15. FIG. 15 is a flow chart showing an operation of the posture change responsive control calculation. Overall operation of the steering damper control apparatus is preferably the same as in the flow chart of FIG. 7 described above, and operation of the normal control calculation is preferably the same as in the flow chart of FIG. 8 described above. Thus, their detailed description is omitted here.

Steps S51, S52

The throttle opening degree change rate calculating unit 95 receives signals from the throttle position sensor 39, and calculates a change rate.

Steps S53-S55

The command value output unit 93 branches the process based on the absolute value of the throttle opening degree change rate and the table used to calculate a damping force value 97a. Specifically, the process is branched based on whether or not the absolute value of the throttle opening degree change rate exceeds the first threshold value SD1. When the absolute value of the throttle opening degree change rate exceeds the first threshold value SD1, a damping force command value is determined based on the absolute value of the throttle opening degree change rate and the table used to calculate a damping force value 97a. After turning the idle spin detection flag ON, which indicates that an idle spin has been detected, the process returns to step S4 in FIG. 7. When the absolute value of the throttle opening degree change rate does not exceed the first threshold value SD1, the process returns to step S4 in FIG. 7.

According to the steering damper control apparatus in the present preferred embodiment, as in the first and second preferred embodiments described above, the driving direction of the rear wheel 5 is prevented from deviating from a traveling direction, thus efficiently using the drive of the rear wheel 5 during traveling.

Based on the throttle opening degree from the throttle position sensor 39, the throttle opening degree change rate calculating unit 91 calculates a change rate thereof. When the throttle opening degree change rate is large, the probability of the rear wheel 5 going into an idle spin is extremely high. Thus, the command value output unit 97 presumes an idle spin of the rear wheel 5 based on the throttle opening degree change rate. Therefore, the damping force of the MR damper 45 is increased before the idle spin of the rear wheel 5 actually starts, thus promptly preventing a posture change of the motorcycle 1.

The first threshold value SD1 is stored beforehand in the table used to calculate a damping force value 97a to enable the command value output unit 97 to presume the occurrence of an idle spin of the rear wheel 5 based on this first threshold value SD1 and the throttle opening degree change rate. By setting the first threshold value SD1 appropriately, the timing of increasing the damping force of the MR damper 45 can be adjusted. Therefore, the controllability of the motorcycle 1 can be adjusted. Since the damping force of the MR damper 45 is increased according to the throttle opening degree change rate, the possibility of giving the rider an unnatural feeling is prevented while preventing a posture change of the motorcycle 1.

Further, the second threshold value SD2 is stored beforehand in the table used to calculate a damping force value 97a, and when the absolute value of the throttle opening degree change rate is equal to or higher than the second threshold value SD2, the command value output unit 97 increases the damping force of the MR damper 45 to a maximum. Therefore, by appropriately setting the second threshold value SD2, the timing of increasing the damping force of the MR damper 45 to a maximum can be adjusted. Consequently, the controllability of the motorcycle 1 can be adjusted.

Next, a fourth preferred embodiment of the present invention will be described with reference to the drawings.

Figure 16:
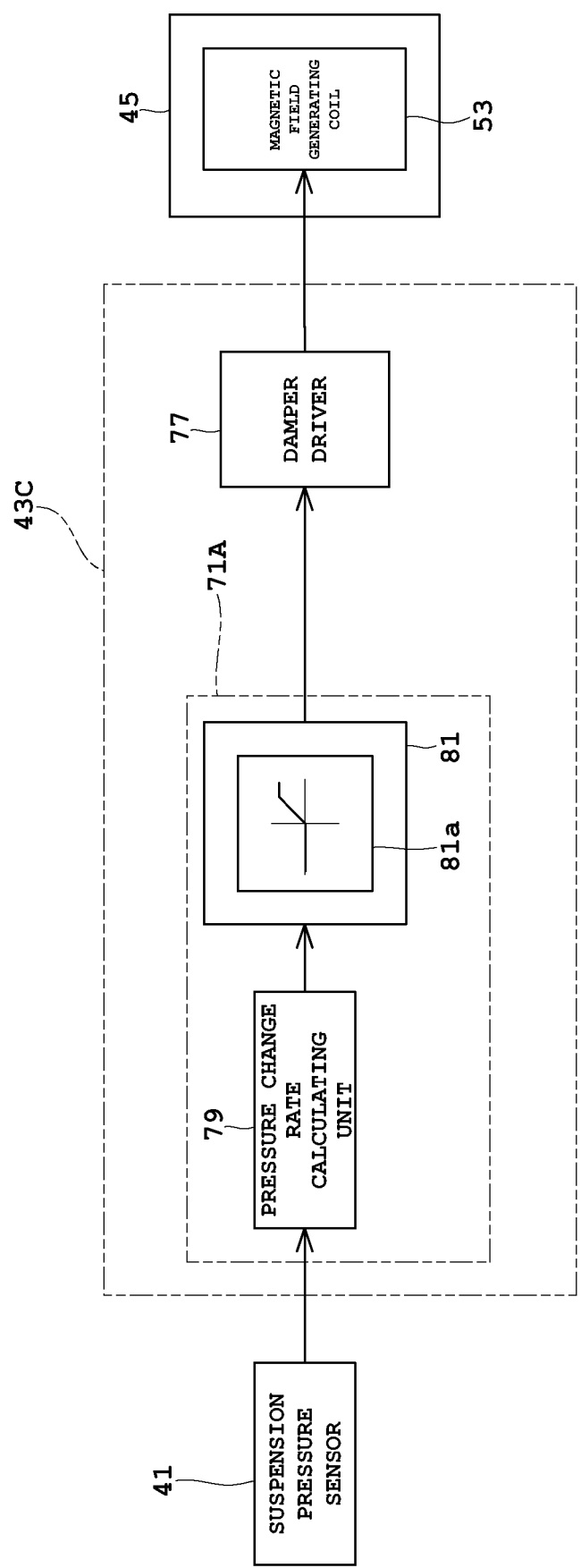
FIG. 16 is a block diagram showing an outline of a steering damper control apparatus according to a fourth preferred embodiment of the present invention.

FIG. 16 is a block diagram showing an outline of a steering damper control apparatus according to the fourth preferred embodiment. Like reference signs are affixed to like components which are the same as in the foregoing first preferred embodiment and will not particularly be described.

A controller 43C according to the fourth preferred embodiment includes a normal control unit 71A and the damper driver 77. The normal control unit 71A is different from that of the foregoing first preferred embodiment. The controller 43C does not include the posture change responsive control unit 73 or the damping force adjusting unit 75 described in the first preferred embodiment.

The normal control unit 71A includes the pressure change rate calculating unit 79 and the command value output unit 81. The pressure change rate calculating unit 79 calculates a pressure change rate of the front suspension 40 based on pressure signals from the suspension pressure sensor 41. The calculated pressure change rate is provided to the command value output unit 81. The command value output unit 81 determines a damping force command value based on the reference table 81a stored beforehand. The damping force command value determined by the command value output unit 81 is provided to the damper driver 77. The damper driver 77 outputs an electric current value corresponding to the damping force command value to the magnetic field generating coil 53 of the MR damper 45.

Figure 17:
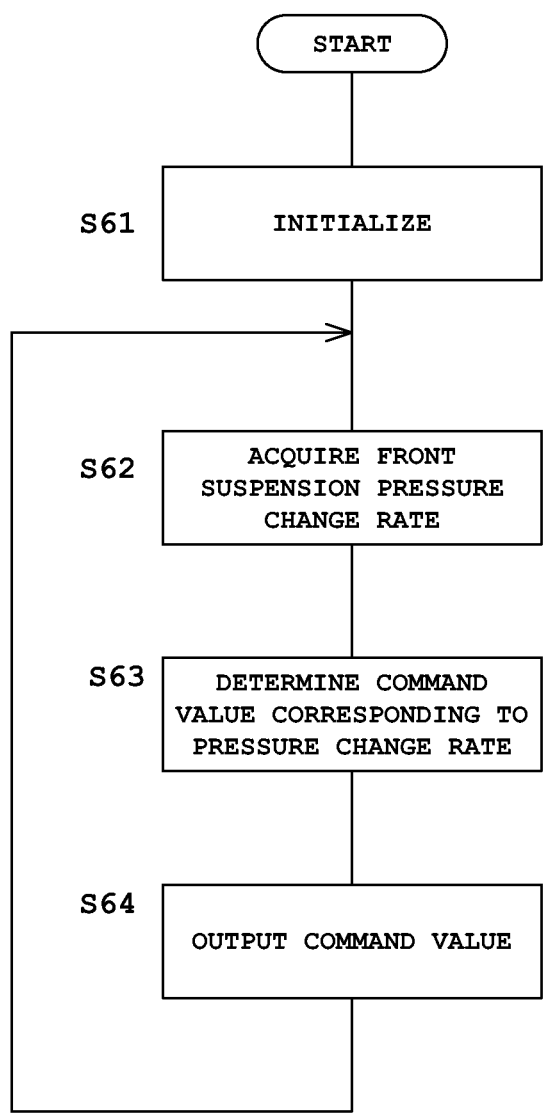
FIG. 17 is a flow chart showing operation of the steering damper control apparatus according to the fourth preferred embodiment of the present invention.

Operation of the steering damper control apparatus will be described with reference to FIG. 17. FIG. 17 is a flow chart showing an operation of the steering damper control apparatus.

Step S61

The controller 43 is initialized. Specifically, the damping force command value to be provided to the damper driver 77 is set to minimum value zero. This places the MR damper 45 in a state of producing no damping force.

Steps S62, S63

The normal control unit 71A acquires pressures of the front suspension 40 from the suspension pressure sensor 41. A damping force command value is determined based on the pressure change rate from the pressure change rate calculating unit 79, and the table used to calculate a damping force value 81a described above.

Step S64

The damping force adjusting unit 75 provides the determined damping force command value to the damper driver 77.

In the steering damper control apparatus in the present preferred embodiment, as in the first preferred embodiment described above, a damping force is generated when steering vibration tends to occur to conveniently prevent steering vibration. Even if the steering device is not actually shaken, steering vibration is reliably prevented.

The present invention is not limited to the foregoing preferred embodiments, but may be modified as described below.

Each of the first through third preferred embodiments described above preferably determines whether the front wheel 3 is out of contact with the ground, and when it is out of contact, reduces the damping force of the MR damper 45 to zero. However, the present invention does not necessarily need to have such construction, but may reduce the cost by omitting this feature.

Each of the first through third preferred embodiments described above preferably increases the damping force command value according to the difference in rotational frequency between the front and rear wheels, the rotational frequency increase rate, or the throttle opening degree change rate. However, the present invention is not limited to such a construction. For example, the damping force command value may be increased to a maximum at a point of time when the difference in rotational frequency between the front and rear wheels, the rotational frequency increase rate, or the throttle opening degree change rate exceeds a threshold value. This can simplify the control.

In each of the first through fourth preferred embodiments described above, the MR damper 45 is preferably used to adjust the damping force, but the present invention is not limited to this construction. For example, using a hydraulic damper to adjust an orifice diameter according to the damping force command value produces the same effects as the case of using the MR damper 45.

In each of the first through fourth preferred embodiments described above, the damping force of the MR damper 45 at normal times preferably is made zero which is a minimum value. However, at normal times, the damping force of a certain amount may be used. This necessitates a steering force at normal times, but prevents wobbling of the steering bar 17 at times of straight traveling.

The first through fourth preferred embodiments described above show by way of example the table used to calculate a damping force value 81a as shown in FIG. 5. However, the table used to calculate a damping force value 81a may be varied as appropriate.

Figure 18:
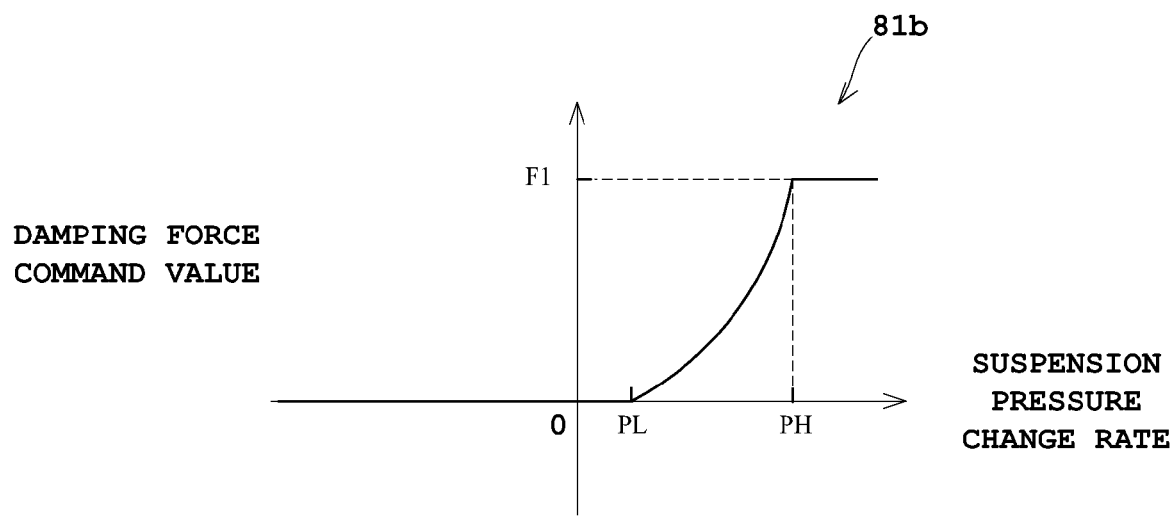
FIG. 18 is a view schematically showing a table used to calculate a damping force command value based on the suspension pressure change rate in a modified preferred embodiment of the present invention.

Reference is made to FIG. 18. FIG. 18 is a view schematically showing a table used to calculate a damping force value 81b based on the suspension pressure change rate in a modified preferred embodiment. The table used to calculate a damping force value 81b is set beforehand as follows. When the pressure change rate is equal to or less than a predetermined value PL, the damping force command value is at a minimum. The predetermined value PL is positive. In a range of the pressure change rate being larger than the predetermined value PL and equal to or less than a threshold value PH, the damping force command value becomes larger as the pressure change rate becomes larger. The threshold value PH is larger than the predetermined value PL. In this range, the amount of increase of the damping force command value becomes larger as the rate of the load change becomes larger. When the pressure change rate is larger than the threshold value PH, the damping force command value has a fixed value FP. The fixed value FP is larger than a minimum. The fixed value FP is equal to the damping force command value at the time when the pressure change rate is at the threshold value PH. Therefore, the damping force command value is continuous near the threshold value PH.

Thus, in at least a portion (i.e., the range larger than the predetermined value PL and equal to or less than the threshold value PH) of the range where the pressure change rate is positive, the damping force command value becomes larger as the pressure change rate becomes larger. Therefore, even when a pressure change of the front fork 13 is steep, steering vibration can be effectively prevented. In this range in particular, the amount of increase of the damping force becomes larger as the rate of change of the load becomes larger. Therefore, steering vibration can be prevented with an increased effect.

When the pressure change rate is smaller than the predetermined value PL, the damping force command value is at a minimum. Consequently, the period (timing) when the damping force is larger than the minimum becomes shorter, and the period (timing) when the damping force is at the minimum becomes longer. This conveniently prevents the steering controllability from being impaired.

The first through fourth preferred embodiments described above provide the suspension pressure sensor 41, but this is not limitative. For example, a change may be made as appropriate to a detector that detects information relating to the load acting on the front wheel 3.

Reference is made to FIGS. 19A to 19D. FIGS. 19A through 19D are views showing modified preferred embodiments of a load information detector that detects information relating to the load acting on the front wheel 3. FIG. 19A through 19D are views of a portion of the front suspension 40 enlarged when the motorcycle 1 is seen from the front.

As shown in FIG. 19A, strain gauges 101 and 102 may be provided to detect a load acting on an axle 100. Preferably, the respective strain gauges 101 and 102 are arranged on an upper portion and a lower portion of the axle 100 of the front wheel 3. Consequently, a load acting on the axle 100 can be detected with high accuracy. The load acting on the axle 100 corresponds to a load acting on the front wheel 3. Therefore, a rate of change of the load acting on the front wheel 3 can be obtained from detection results of the strain gauges 101 and 102.

As shown in FIG. 19B, a velocity sensor 103 may be provided to detect extension/contraction velocity of the front suspension 40 (front fork 9R). The velocity sensor 103 may include a coil or the like to detect extension/contraction velocity of the front suspension 40 based on variations of magnetic flux. Or the velocity sensor 103 may be an optical surface velocity sensor using laser light, for example. The extension/contraction velocity of the front suspension 40 has a value which corresponds to a rate of change of the load on the front wheel 3.

As shown in FIG. 19C, an acceleration sensor 105 may be provided to detect acceleration in the axial direction (direction of extension and contraction) of the front suspension 40 (front fork 9R). The detection result of the acceleration sensor 105 corresponds to what results from a further time differentiation of the rate of change of the load on the front wheel 3. Therefore, a value which corresponds to a rate of change of the load acting on the front wheel 3 can be acquired from the detection result of the acceleration sensor 105.

As shown in FIG. 19D, an acceleration sensor 107 may be provided to detect acceleration in the vertical direction of the axle 100. The detection result of the acceleration sensor 107 corresponds to what results from a further time differentiation of the rate of change of the load on the front wheel 3. Therefore, a value which corresponds to a rate of change of the load acting on the front wheel 3 can be acquired from the detection result of the acceleration sensor 107.

Although not shown, the suspension pressure sensor 41 may be replaced with a stroke sensor to detect an amount of stroke of the front suspension 40. The amount of stroke of the front suspension 40 corresponds to the load acting on the front wheel 3. Therefore, a rate of change of the load acting on the front wheel 3 can be acquired from the detection result of the stroke sensor.

Each of the various sensors 101, 102, 103, 105 and 107 and the stroke sensor described above corresponds to the load information detector in the present preferred embodiment.

Each of foregoing first through fourth preferred embodiments has been described with respect to a motorcycle 1 as an example of a saddle riding type vehicle. However, besides the motorcycle 1, the present invention is applicable to any vehicle with an engine in which people can ride in a straddling state, such as a three-wheeled motorcycle with two front wheels or two rear wheels, for example.

As described above, preferred embodiments of the present invention are suitable for a steering damper control apparatus provided for a steering device of a vehicle to adjust a steering damping force, and a saddle riding type vehicle having the same.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A steering damper control apparatus comprising:
    a damper having an adjustable steering damping force;
    a load information detecting unit that detects information relating to a load acting upward on a front wheel;
    a command value output unit that determines a damping force command value according to a rate of change of the load acting upward on the front wheel or a value corresponding to the rate of change based on a detection result of the load information detecting unit; and
    a damper driver that causes the damper to generate a damping force according to the damping force command value.

2. The steering damper control apparatus according to claim 1, wherein in at least a portion of a range where the rate of change of the load or the value corresponding to the rate of change is positive, the damping force command value becomes larger as the rate of change of the load or the value corresponding to the rate of change becomes larger.

3. The steering damper control apparatus according to claim 2, wherein, within the range, an amount of increase of the damping force command value becomes larger as the rate of change of the load becomes larger.

4. The steering damper control apparatus according to claim 2, wherein, within the range, the damping force command value becomes larger at a constant rate as the rate of change of the load or the value corresponding to the rate of change becomes larger.

5. The steering damper control apparatus according to claim 1, wherein when the rate of change of the load or the value corresponding to the rate of change is larger than a positive threshold value, the damping force command value is a fixed value.

6. The steering damper control apparatus according to claim 5, wherein the fixed value is equal to the damping force command value at a time when the rate of change of the load or the value corresponding to the rate of change is at the positive threshold value.

7. The steering damper control apparatus according to claim 1, wherein, when the rate of change of the load or the value corresponding to the rate of change is smaller than a predetermined positive value, the damping force command value is at a minimum.

8. The steering damper control apparatus according to claim 1, wherein, when the rate of change of the load or the value corresponding to the rate of change is positive, the damping force command value is larger than a minimum.

9. The steering damper control apparatus according to claim 1, wherein, when the rate of change of the load or the value corresponding to the rate of change is negative, the damping force command value is at a minimum.

10. The steering damper control apparatus according to claim 1, wherein the damper includes a magnetic fluid and a magnetic field generating coil that applies a magnetic field to the magnetic fluid; and
    the damper driver causes an electric current corresponding to the damping force command value to flow to the magnetic field generating coil.

11. The steering damper control apparatus according to claim 10, wherein the damper generates the damping force by a shearing force of the magnetic fluid; and
    the magnetic field generating coil varies the shearing force of the magnetic fluid.

12. The steering damper control apparatus according to claim 1, wherein the load information detecting unit includes a pressure detecting device that detects a pressure of a suspension of the front wheel; and the command value output unit determines the damping force command value according to a rate of change of the pressure of the suspension.

13. The steering damper control apparatus according to claim 1, wherein the load acting upward includes an extension load and/or a contraction load on a suspension of the front wheel.

14. A saddle riding type vehicle including a steering damper control apparatus, the steering damper control apparatus comprising:

a damper having an adjustable steering damping force;

a load information detecting unit that detects information relating to a load acting upward on a front wheel;

a command value output unit that determines a damping force command value according to a rate of change of the load acting upward on the front wheel or a value corresponding to the rate of change based on a detection result of the load information detecting unit; and a damper driver that causes the damper to generate a damping force according to the damping force command value.

15. The saddle riding type vehicle according to claim 14, wherein the load acting upward includes an extension load and/or a contraction load on a suspension of the front wheel.

\* \* \* \* \*